US012696249B2

(12) United States Patent　　　(10) Patent No.:　US 12,696,249 B2
Abotabl et al.　　　　　　　　　　　(45) Date of Patent:　　　Jul. 28, 2026

(54) BANDWIDTH PART SWITCHING TECHNIQUES FOR NETWORK POWER SAVINGS

(71) Applicant: QUALCOMM Incorporated, San Diego, CA (US)

(72) Inventors: Ahmed Attia Abotabl, San Diego, CA (US); Marwen Zorgui, San Diego, CA (US); Ahmed Elshafie, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 572 days.

(21) Appl. No.: 18/048,492

(22) Filed: Oct. 21, 2022

(65) Prior Publication Data

US 2024/0137918 A1　　Apr. 25, 2024
US 2024/0236959 A9　　Jul. 11, 2024

(51) Int. Cl.
*H04W 72/04*　　　(2023.01)
*H04W 8/24*　　　 (2009.01)
*H04W 72/0453*　　(2023.01)

(52) U.S. Cl.
CPC ......... *H04W 72/0453* (2013.01); *H04W 8/24* (2013.01)

(58) Field of Classification Search
CPC ..... H04L 5/0098; H04L 5/001; H04L 5/0094; H04L 5/0057; H04L 5/0051; H04W 8/24;
(Continued)

(56) References Cited

U.S. PATENT DOCUMENTS

2019/0312635 A1　10/2019　Ang et al.
2021/0392614 A1　12/2021　Sakhnini et al.
(Continued)

OTHER PUBLICATIONS

Etri: "UE Bandwidth Configuration During Initial Access", 3GPP TSG RAN WG1 NR Ad-Hoc#2, R1-1710622, UE Bandwidth Configuration During Initial Access—Final, 3rd Generation Partnership Project, Mobile Competence Centre, 650, Route Des Lucioles, F-06921 Sophia-Antipoli, vol. RAN WG1, No. Qingdao, China, Jun. 27, 2017-Jun. 30, 2017, Jun. 17, 2017, pp. 1-5, XP051305172.
(Continued)

*Primary Examiner* — Congvan Tran
(74) *Attorney, Agent, or Firm* — Holland & Hart LLP/ QUALCOMM Incorporated

(57)　　　　　　ABSTRACT

Methods, systems, and devices for wireless communication are described. A user equipment (UE) may receive an indication of parameters associated with a temporary bandwidth part (BWP) switch from a first BWP to a second BWP. The parameters may include a time duration for the temporary BWP switching procedure, a network antenna configuration for the second BWP, transmission parameters for communications scheduled in the second BWP, or a combination thereof. The UE may switch from the first BWP to the second BWP in accordance with the temporary BWP switching procedure and communicate with a network entity using the indicated parameters. For example, the UE may receive one or more downlink messages or transmit one or more uplink messages in accordance with the indicated parameters. Thereafter, the UE may switch from the second BWP to a third BWP in accordance with the temporary BWP switching procedure.

30 Claims, 16 Drawing Sheets

(58) Field of Classification Search
CPC . H04W 52/42; H04W 72/0453; H04W 72/23;
H04W 72/51
See application file for complete search history.

(56) References Cited

U.S. PATENT DOCUMENTS

| | | | | |
|---|---|---|---|---|
| 2023/0042400 A1* | 2/2023 | Gursu | ................. | H04W 56/001 |
| 2023/0247501 A1* | 8/2023 | Kim | ................. | H04W 74/0833 |
| | | | | 370/331 |
| 2023/0354321 A1* | 11/2023 | Chen | ................... | H04W 72/566 |
| 2024/0129924 A1* | 4/2024 | Zorgui | ................. | H04L 5/0098 |
| 2024/0188122 A1* | 6/2024 | Desai | ................. | H04W 74/006 |

OTHER PUBLICATIONS

International Search Report and Written Opinion—PCT/US2023/034569—ISA/EPO—Feb. 13, 2024 (2207866WO).
Chochliouros I.P., et al., "Energy Efficiency Concerns and Trends in Future 5G Network Infrastructures", Energies, 5G Enabled Energy Innovation, MDPI, https://www.mdpi.com/1996-1073/14/17/5392, 2021, vol. 14, No. 17, 5392, Aug. 30, 2021, pp. 1-14.
Hatt T., et al., "5G Energy Efficiencies: Green is the new black", GSM Intelligence, https://www.gsmaintelligence.com/research/5g-energy-efficiencies-green-is-the-new-black, Nov. 2020, 26 pages.
HUAWEI: "New SI: Study on Network Energy Savings for NR", 3GPP TSG RAN Meeting #94e, RP-213554 (Revision of RP-212709), Electronic Meeting, Dec. 6-17, 2021, 5 pages.

* cited by examiner

605 — UE Capability Information

RRC Signaling — 610

DCI — 615

Switch to Second BWP — 620

PDSCH Transmission — 625

630 — PUSCH Transmission

Switch to Third BWP — 635

UE 115-c

Network Entity 105-b

600

1110

1120

1115

1105

1100

130

105

115

Network
Entity

Transceiver

1410

Antenna

1415

Communications
Manager

1420

Memory

Code

1430

1425

1440

Processor

1435

1405

1400

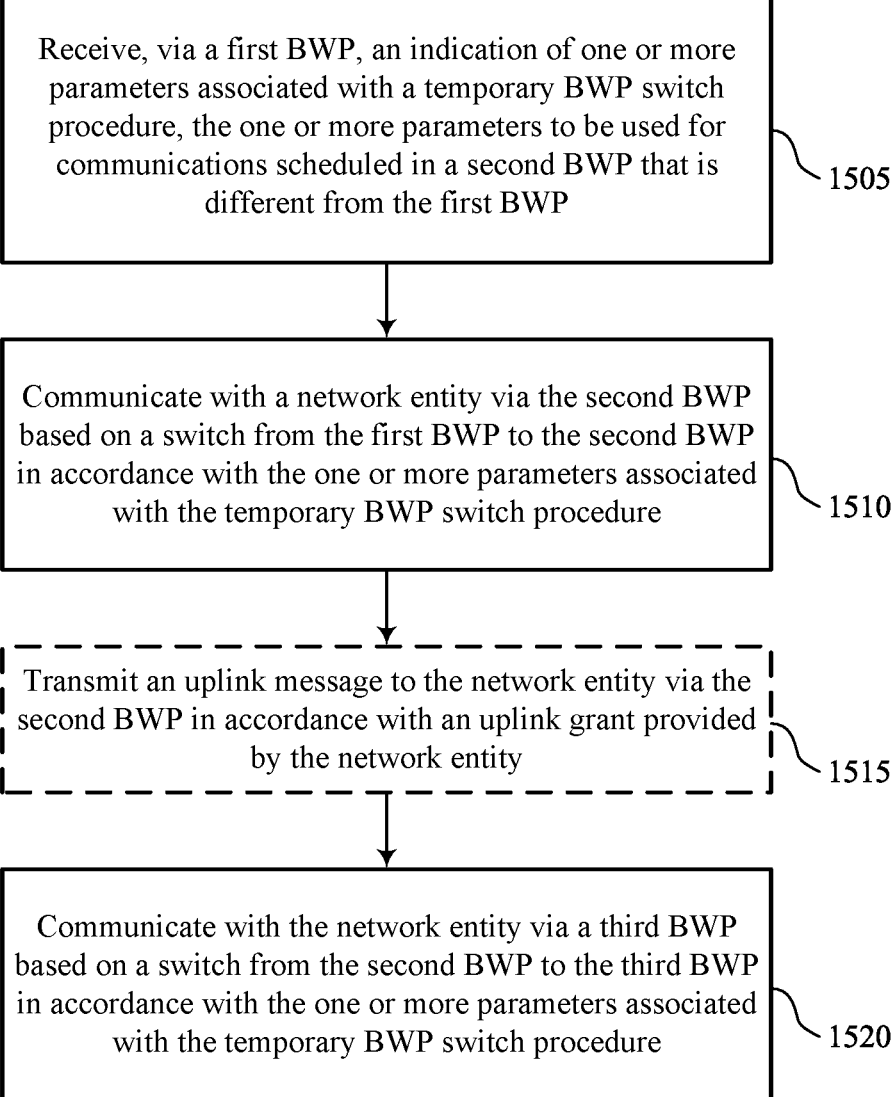

Receive, via a first BWP, an indication of one or more parameters associated with a temporary BWP switch procedure, the one or more parameters to be used for communications scheduled in a second BWP that is different from the first BWP

1505

Communicate with a network entity via the second BWP based on a switch from the first BWP to the second BWP in accordance with the one or more parameters associated with the temporary BWP switch procedure

1510

Transmit an uplink message to the network entity via the second BWP in accordance with an uplink grant provided by the network entity

1515

Communicate with the network entity via a third BWP based on a switch from the second BWP to the third BWP in accordance with the one or more parameters associated with the temporary BWP switch procedure

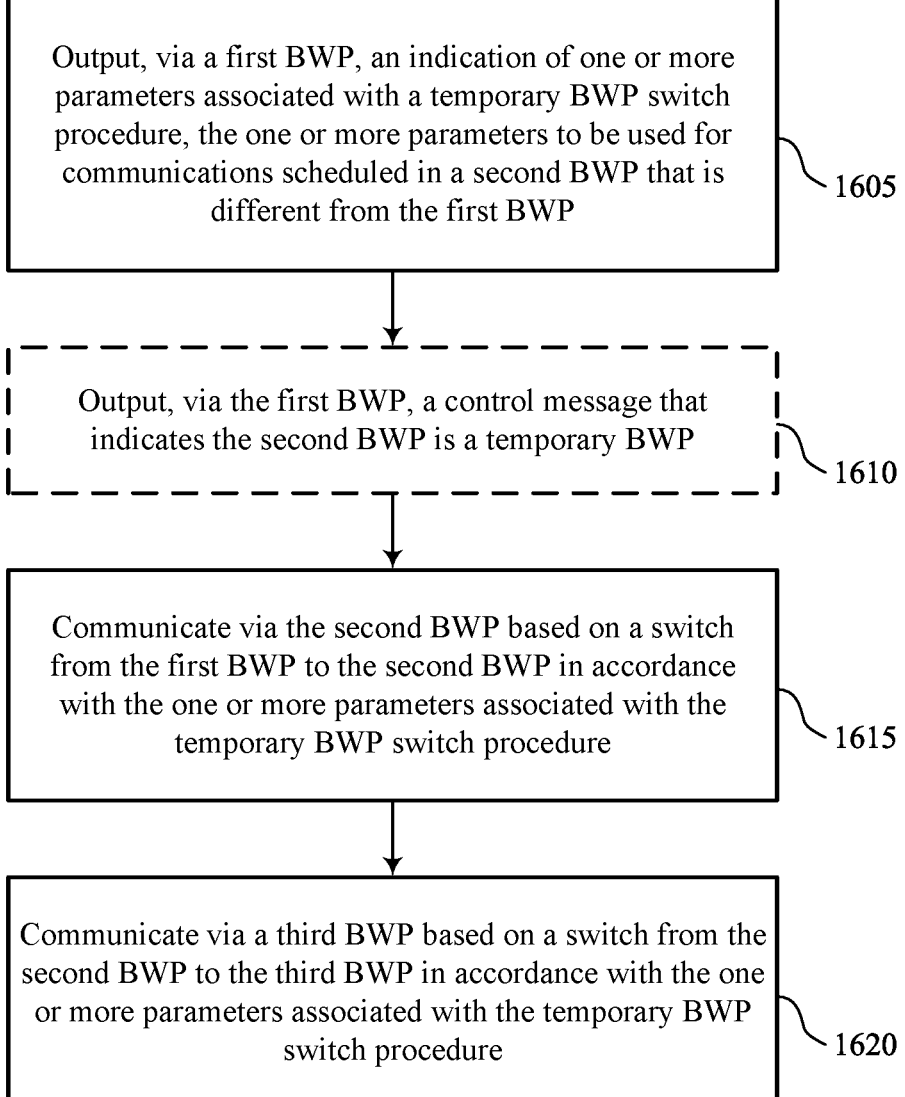

Output, via a first BWP, an indication of one or more parameters associated with a temporary BWP switch procedure, the one or more parameters to be used for communications scheduled in a second BWP that is different from the first BWP

1605

Output, via the first BWP, a control message that indicates the second BWP is a temporary BWP

1610

Communicate via the second BWP based on a switch from the first BWP to the second BWP in accordance with the one or more parameters associated with the temporary BWP switch procedure

1615

Communicate via a third BWP based on a switch from the second BWP to the third BWP in accordance with the one or more parameters associated with the temporary BWP switch procedure

BANDWIDTH PART SWITCHING TECHNIQUES FOR NETWORK POWER SAVINGS

INTRODUCTION

The following relates to wireless communication, including managing bandwidth part (BWP) switching operations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

A method for wireless communication at a UE is described. The method may include receiving, via a first BWP, an indication of one or more parameters associated with a temporary BWP switch procedure. In some examples, the one or more parameters may be used for communications scheduled in a second BWP that is different from the first BWP. The method may further include communicating with a network entity via the second BWP based on a switch from the first BWP to the second BWP in accordance with the one or more parameters associated with the temporary BWP switch procedure. The method may further include communicating with the network entity via a third BWP based on a switch from the second BWP to the third BWP in accordance with the one or more parameters associated with the temporary BWP switch procedure.

An apparatus for wireless communication is described. The apparatus may include a processor and memory coupled with the processor, where the processor is configured to receive, via a first BWP, an indication of one or more parameters associated with a temporary BWP switch procedure. In some examples, the one or more parameters may be used for communications scheduled in a second BWP that is different from the first BWP. The processor may be further configured to communicate with a network entity via the second BWP based on a switch from the first BWP to the second BWP in accordance with the one or more parameters associated with the temporary BWP switch procedure. The processor may be further configured to communicate with the network entity via a third BWP based on a switch from the second BWP to the third BWP in accordance with the one or more parameters associated with the temporary BWP switch procedure.

Another apparatus for wireless communication is described. The apparatus may include means for receiving, via a first BWP, an indication of one or more parameters associated with a temporary BWP switch procedure. In some examples, the one or more parameters may be used for communications scheduled in a second BWP that is different from the first BWP. The apparatus may further include means for communicating with a network entity via the second BWP based on a switch from the first BWP to the second BWP in accordance with the one or more parameters associated with the temporary BWP switch procedure. The apparatus may further include means for communicating with the network entity via a third BWP based on a switch from the second BWP to the third BWP in accordance with the one or more parameters associated with the temporary BWP switch procedure.

A non-transitory computer-readable medium storing code for wireless communication is described. The code may include instructions executable by a processor to receive, via a first BWP, an indication of one or more parameters associated with a temporary BWP switch procedure. In some examples, the one or more parameters may be used for communications scheduled in a second BWP that is different from the first BWP. The instructions may be further executable by the processor to communicate with a network entity via the second BWP based on a switch from the first BWP to the second BWP in accordance with the one or more parameters associated with the temporary BWP switch procedure. The instructions may be further executable by the processor to communicate with the network entity via a third BWP based on a switch from the second BWP to the third BWP in accordance with the one or more parameters associated with the temporary BWP switch procedure.

In some examples of the methods, apparatuses, and non-transitory computer-readable media described herein, the one or more parameters indicate a quantity of symbols, slots, frames, or milliseconds for the UE to monitor the second BWP in accordance with the temporary BWP switch procedure.

In some examples of the methods, apparatuses, and non-transitory computer-readable media described herein, the one or more parameters indicate at least one of an antenna configuration, a transmit power configuration, a transmit beam configuration, or a receive beam configuration for the communications scheduled in the second BWP.

In some examples, to receive the indication of the one or more parameters, the methods, apparatuses, and non-transitory computer-readable media described herein may include operations, features, means, or instructions for receiving, via the first BWP, a control message that indicates the second BWP is a temporary BWP.

Some examples of the methods, apparatuses, and non-transitory computer-readable media described herein may further include operations, features, means, or instructions for transmitting an uplink message to the network entity via the second BWP in accordance with an uplink grant provided by the network entity.

Some examples of the methods, apparatuses, and non-transitory computer-readable media described herein may further include operations, features, means, or instructions for receiving a downlink message from the network entity via the second BWP in accordance with the one or more parameters associated with the temporary BWP switch procedure.

In some examples of the methods, apparatuses, and non-transitory computer-readable media described herein, the downlink message includes a demodulation reference signal (DMRS) sequence that indicates the second BWP is a temporary BWP.

In some examples, to receive the indication of the one or more parameters, the methods, apparatuses, and non-transitory computer-readable media described herein may include operations, features, means, or instructions for receiving a radio resource control (RRC) message that indicates a configuration for each of the first BWP, the second BWP, and the third BWP.

In some examples, to receive the indication of the one or more parameters, the methods, apparatuses, and non-transitory computer-readable media described herein may include operations, features, means, or instructions for receiving an instance of downlink control information (DCI) that indicates whether a BWP switch from the first BWP to the second BWP is a temporary BWP switch.

In some examples, to receive the indication of the one or more parameters, the methods, apparatuses, and non-transitory computer-readable media described herein may include operations, features, means, or instructions for receiving an instance of DCI that indicates a time duration for a temporary BWP switch from the first BWP to the second BWP.

Some examples of the methods, apparatuses, and non-transitory computer-readable media described herein may further include operations, features, means, or instructions for receiving, via the second BWP, at least one downlink message within the time duration indicated by the instance of DCI.

Some examples of the methods, apparatuses, and non-transitory computer-readable media described herein may further include operations, features, means, or instructions for transmitting, via the second BWP, at least one uplink message within the time duration indicated by the instance of DCI.

In some examples of the methods, apparatuses, and non-transitory computer-readable media described herein, the one or more parameters indicate the time duration for the temporary BWP switch per BWP or per cell.

Some examples of the methods, apparatuses, and non-transitory computer-readable media described herein may further include operations, features, means, or instructions for switching from the second BWP to the third BWP within a time gap indicated by the one or more parameters associated with the temporary BWP switch procedure.

Some examples of the methods, apparatuses, and non-transitory computer-readable media described herein may further include operations, features, means, or instructions for receiving information associated with a downlink transmission scheduled in the second BWP. In some examples, the information indicates that the second BWP is a temporary BWP.

In some examples of the methods, apparatuses, and non-transitory computer-readable media described herein, the information indicates one or more of a modulation and coding scheme (MCS), a quantity of layers, a time domain resource allocation (TDRA) index, or a frequency domain resource allocation (FDRA) index associated with the downlink transmission scheduled in the second BWP.

In some examples of the methods, apparatuses, and non-transitory computer-readable media described herein, the information indicates a time duration for the UE to monitor the temporary BWP.

Some examples of the methods, apparatuses, and non-transitory computer-readable media described herein may further include operations, features, means, or instructions for transmitting a message that indicates one or more of a capability of the UE to perform a temporary BWP switch, a quantity of BWPs supported for the temporary BWP switch, or a minimum time duration supported for the temporary BWP switch.

Some examples of the methods, apparatuses, and non-transitory computer-readable media described herein may further include operations, features, means, or instructions for transmitting an indication of a channel state information (CSI) report based on one or more CSI reference signals (CSI-RS) received via the second BWP. In some examples, the CSI report may be generated in accordance with the one or more parameters associated with the temporary BWP switch procedure.

Some examples of the methods, apparatuses, and non-transitory computer-readable media described herein may further include operations, features, means, or instructions for receiving a downlink message via the second BWP in accordance with the temporary BWP switch procedure.

Some examples of the methods, apparatuses, and non-transitory computer-readable media described herein may further include operations, features, means, or instructions for decoding the downlink message based on the one or more parameters associated with the temporary BWP switch procedure.

In some examples of the methods, apparatuses, and non-transitory computer-readable media described herein, the third BWP includes the first BWP.

In some examples of the methods, apparatuses, and non-transitory computer-readable media described herein, the UE includes one or more interfaces coupled with one or more antennas.

A method for wireless communication at a network entity is described. The method may include outputting, via a first BWP, an indication of one or more parameters associated with a temporary BWP switch procedure, where the one or more parameters are to be used for communications scheduled in a second BWP that is different from the first BWP. The method may further include communicating via the second BWP based on a switch from the first BWP to the second BWP in accordance with the one or more parameters associated with the temporary BWP switch procedure. The method may further include communicating via a third BWP based on a switch from the second BWP to the third BWP in accordance with the one or more parameters associated with the temporary BWP switch procedure.

An apparatus for wireless communication is described. The apparatus may include a processor and memory coupled with the processor, where the processor is configured to output, via a first BWP, an indication of one or more parameters associated with a temporary BWP switch procedure. In some examples, the one or more parameters may be used for communications scheduled in a second BWP that is different from the first BWP. The processor may be further configured to communicate via the second BWP based on a switch from the first BWP to the second BWP in accordance with the one or more parameters associated with the temporary BWP switch procedure. The processor may be further configured to communicate via a third BWP based on a switch from the second BWP to the third BWP in accordance with the one or more parameters associated with the temporary BWP switch procedure.

Another apparatus for wireless communication is described. The apparatus may include means for outputting, via a first BWP, an indication of one or more parameters associated with a temporary BWP switch procedure. In some examples, the one or more parameters may be used for communications scheduled in a second BWP that is different from the first BWP. The apparatus may further include means for communicating via the second BWP based on a switch from the first BWP to the second BWP in accordance with the one or more parameters associated with the temporary BWP switch procedure. The apparatus may further include means for communicating via a third BWP based on a switch from the second BWP to the third BWP in accordance with the one or more parameters associated with the temporary BWP switch procedure.

A non-transitory computer-readable medium storing code for wireless communication is described. The code may include instructions executable by a processor to output, via a first BWP, an indication of one or more parameters associated with a temporary BWP switch procedure. In some examples, the one or more parameters may be used for communications scheduled in a second BWP that is different from the first BWP. The instructions may be further executable by the processor to communicate via the second BWP based on a switch from the first BWP to the second BWP in accordance with the one or more parameters associated with the temporary BWP switch procedure. The instructions may be further executable by the processor to communicate via a third BWP based on a switch from the second BWP to the third BWP in accordance with the one or more parameters associated with the temporary BWP switch procedure.

In some examples of the methods, apparatuses, and non-transitory computer-readable media described herein, the one or more parameters indicate a quantity of symbols, slots, frames, or milliseconds for the apparatus to monitor the second BWP in accordance with the temporary BWP switch procedure.

In some examples of the methods, apparatuses, and non-transitory computer-readable media described herein, the one or more parameters indicate at least one of an antenna configuration, a transmit power configuration, a transmit beam configuration, or a receive beam configuration for the communications scheduled in the second BWP.

In some examples, to output the indication of the one or more parameters, the methods, apparatuses, and non-transitory computer-readable media described herein may include operations, features, means, or instructions for outputting, via the first BWP, a control message that indicates the second BWP is a temporary BWP.

Some examples of the methods, apparatuses, and non-transitory computer-readable media described herein may further include operations, features, means, or instructions for obtaining an uplink message via the second BWP in accordance with an uplink grant provided by the network entity.

In some examples of the methods, apparatuses, and non-transitory computer-readable media described herein, the network entity includes one or more interfaces coupled with one or more antennas.

BRIEF DESCRIPTION OF THE DRAWINGS

FIGS. 15 and 16 show flowcharts illustrating methods that support BWP switching techniques for network power savings in accordance with one or more aspects of the present disclosure.

DETAILED DESCRIPTION

Figure 1:
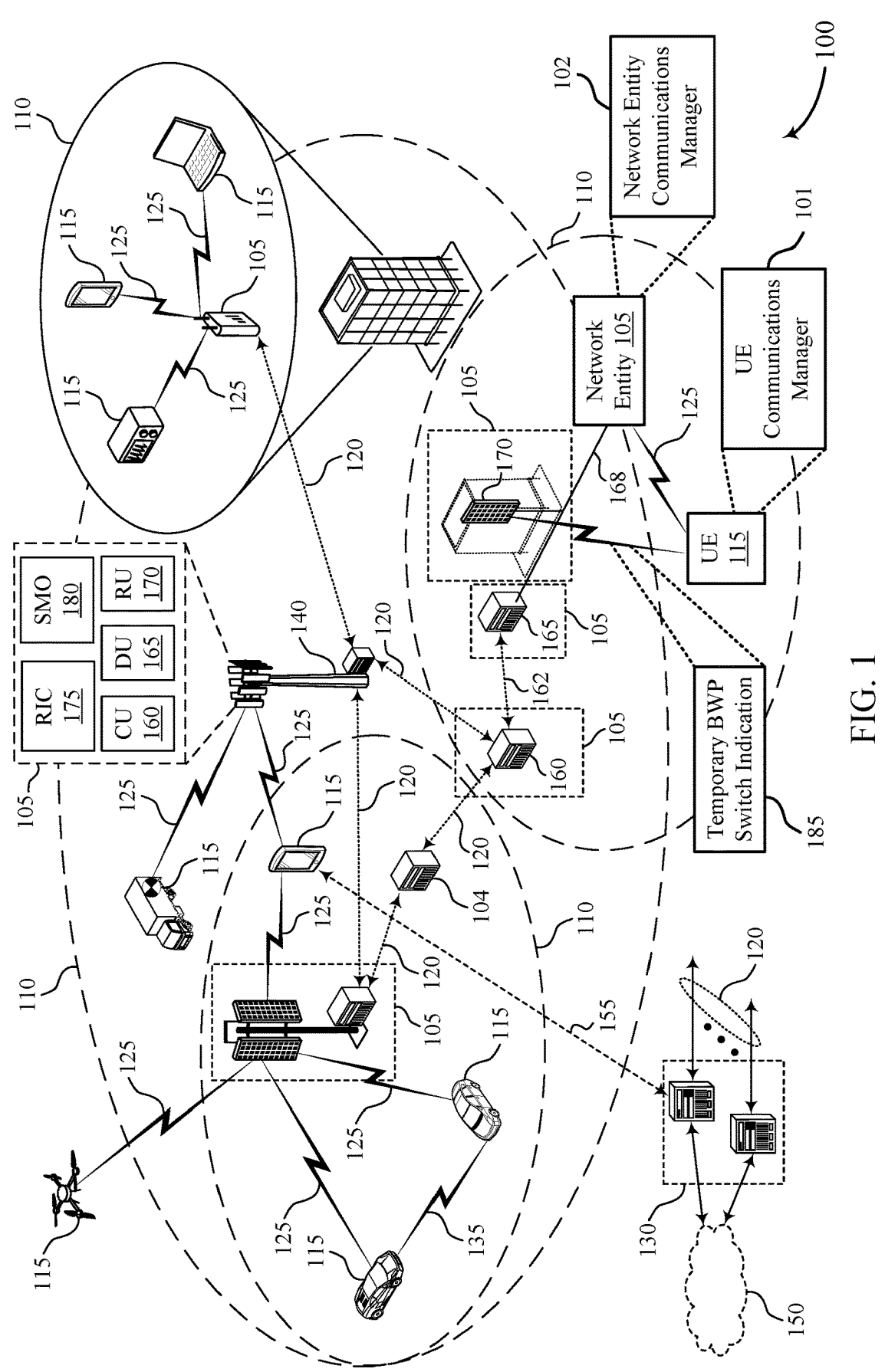
FIG. 1 illustrates an example of a wireless communications system that supports BWP switching techniques for network power savings in accordance with one or more aspects of the present disclosure.

In some wireless communications systems, a UE may communicate with a network entity using at least one BWP. As described herein, a BWP may refer to a contiguous set of one or more physical resource blocks (PRBs). In some cases, the network entity may configure the UE to switch from a first BWP to a second BWP if, for example, channel conditions associated with the first BWP deteriorate, or if the network entity determines that channel conditions associated with the second BWP are more favorable than channel conditions associated with the first BWP. The network entity may instruct the UE to switch from the first BWP to the second BWP by transmitting an instance of DCI to the UE. In some cases, however, if the network entity wants the UE to switch back to the first BWP (for example, if channel conditions associated with the first BWP improve relative to channel conditions associated with the second BWP), the network entity may have to transmit another instance of DCI to the UE, resulting in signaling overhead, processing latency, and extraneous power consumption.

The techniques and signaling mechanisms described herein support temporary BWP switching at a UE. In accordance with aspects of the present disclosure, the UE may receive an instance of DCI that indicates one or more parameters associated with a temporary BWP switch procedure. As described herein, a temporary BWP switch procedure may refer to the UE switching from a first (initial) BWP to a second (temporary) BWP and using the one or more parameters to communicate with a network entity via the second BWP. For example, the UE may transmit one or more uplink messages (in accordance with an uplink grant provided by the network entity) or receive one or more downlink messages (in accordance with downlink scheduling information provided by the network entity) using frequency resources associated with the second BWP. In some examples, the UE may switch back to the first BWP after monitoring the second BWP. In other examples, the UE may switch to a third (different) BWP after monitoring the second BWP.

The one or more parameters associated with the BWP switch may include, for example, an identifier of the second BWP, a time duration for the temporary BWP switch, a network antenna configuration, a transmit power configuration, a communication beam configuration, or a combination thereof. The time duration of the temporary BWP switch may be signaled as a quantity of symbols, slots, frames, or milliseconds. As described herein, the network antenna configuration may refer to a quantity of antenna ports used for downlink communications scheduled in the second (temporary) BWP, the transmit power configuration may indicate a transmit power used for downlink communications scheduled in the second BWP, and the communication beam configuration may indicate a set of one or more communication beams used for uplink or downlink communications scheduled in the second BWP.

The techniques and signaling mechanisms described herein may reduce the overall latency, power consumption, and signaling overhead associated with BWP switching operations in a wireless communications system. For example, the techniques described herein may enable a UE to perform multiple BWP switches based on a single instance of DCI from a network entity, as opposed to receiving one control message for each BWP switch. As a result, the network entity may transmit fewer control messages to the UE, which may result in greater power savings and reduced signaling overhead at the network entity. Moreover, the UE may allocate fewer processing resources to receiving and decoding control messages from the network entity, which may result in lower processing latency and reduced power consumption at the UE.

Aspects of the disclosure are initially described in the context of wireless communications systems, system architectures, resource diagrams, and process flows. Aspects of the disclosure are further illustrated by and described with reference to apparatus diagrams, system diagrams, and flowcharts that relate to BWP switching techniques for network power savings.

FIG. 1 illustrates an example of a wireless communications system 100 that supports BWP switching techniques for network power savings in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115.

In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130).

In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof.

An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)).

The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170).

A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120).

IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support BWP switching techniques for network power savings as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling.

The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

As described herein, the electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It is to be understood that, although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it is to be understood that the term "sub-6 GHz" or the like, if used herein, may broadly represent frequencies that may be less than 6 GHz, may be within FR1, or may include mid-band frequencies. Further, unless specifically stated otherwise, it is to be understood that the term "millimeter wave" or the like, if used herein, may broadly represent frequencies that may include mid-band frequencies, may be within FR2, FR4, FR4-a or FR4-1, and/or FR5, or may be within the EHF band.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some wireless communications systems that support cellular communications, network energy consumption may result in higher costs for network operators. A relatively large portion of network energy consumption may be attributed to RAN devices, such as AAUs that support massive MIMO communication schemes. Network energy saving features may be used to improve the efficiency and cost effectiveness of the wireless communications system 100. The wireless communications system 100 may support network energy savings for various NR devices. For some base station energy consumption models, it may be desirable to enhance the power consumption modelling framework and evaluation methodology at the base station side, including relative energy consumption for downlink and uplink (considering factors like PA efficiency, number of transmitting RUs, base station load), sleep states and associated transition times, and other reference parameters and/or configurations.

The techniques described herein may support improved evaluation methodologies and corresponding KPIs. The evaluation methodologies disclosed herein may be used for evaluating system-level network energy consumption and energy savings gains, as well as for assessing and balancing the overall impact on network and user performance (e.g. spectral efficiency, capacity, UPT, latency, handover performance, call drop rate, initial access performance, SLA assurance-related KPIs), energy efficiency, UE power consumption, and UE complexity. The evaluation methodologies described herein may focus on multiple different KPIs, and may reuse existing KPIs (if applicable) in combination with other KPIs.

Aspects of the present disclosure may support techniques for improved network energy savings for network entities 105 and UEs 115 in terms of base station transmission and reception, which may enable such devices to attain greater efficiency (dynamically and/or semi-statically) and utilize more granular transmission/reception schemes that support network energy savings in time, frequency, space, or power, with potential support and/or feedback from UEs 115, as well as potential UE assistance information. Additionally, or alternatively, the described techniques may support information exchange and/or coordination over network interfaces between communication devices in the wireless communications system 100.

As illustrated in the example of FIG. 1, a UE 115 may include a communications manager 101, which may be an example of the communications manager 720 described with reference to FIG. 7. Likewise, a network entity 105 may include a communications manager 102, which may be an example of a communications manager 1120 described with reference to FIG. 11. The communications manager 102 may output a temporary BWP switching indication 185 for transmission to the UE 115. The temporary BWP switching indication 185 may include one or more parameters associated with a procedure for a temporary BWP switch from a first (initial) BWP to a second (temporary) BWP.

Accordingly, the communications manager 101 may obtain the temporary BWP switching indication 185 from the network entity 105 and switch from the first BWP to the second BWP in accordance with the one or more parameters. In some examples, the communications manager 102 may output a downlink message for transmission to the UE 115 via time and frequency resources in the second BWP. Additionally, or alternatively, the communications manager 101 may output an uplink message for transmission to the network entity 105 via time and frequency resources in the second BWP. The UE 115 may, in some examples, switch from the second BWP to a third BWP after a time duration identified by the temporary BWP switching indication 185.

Figure 2:
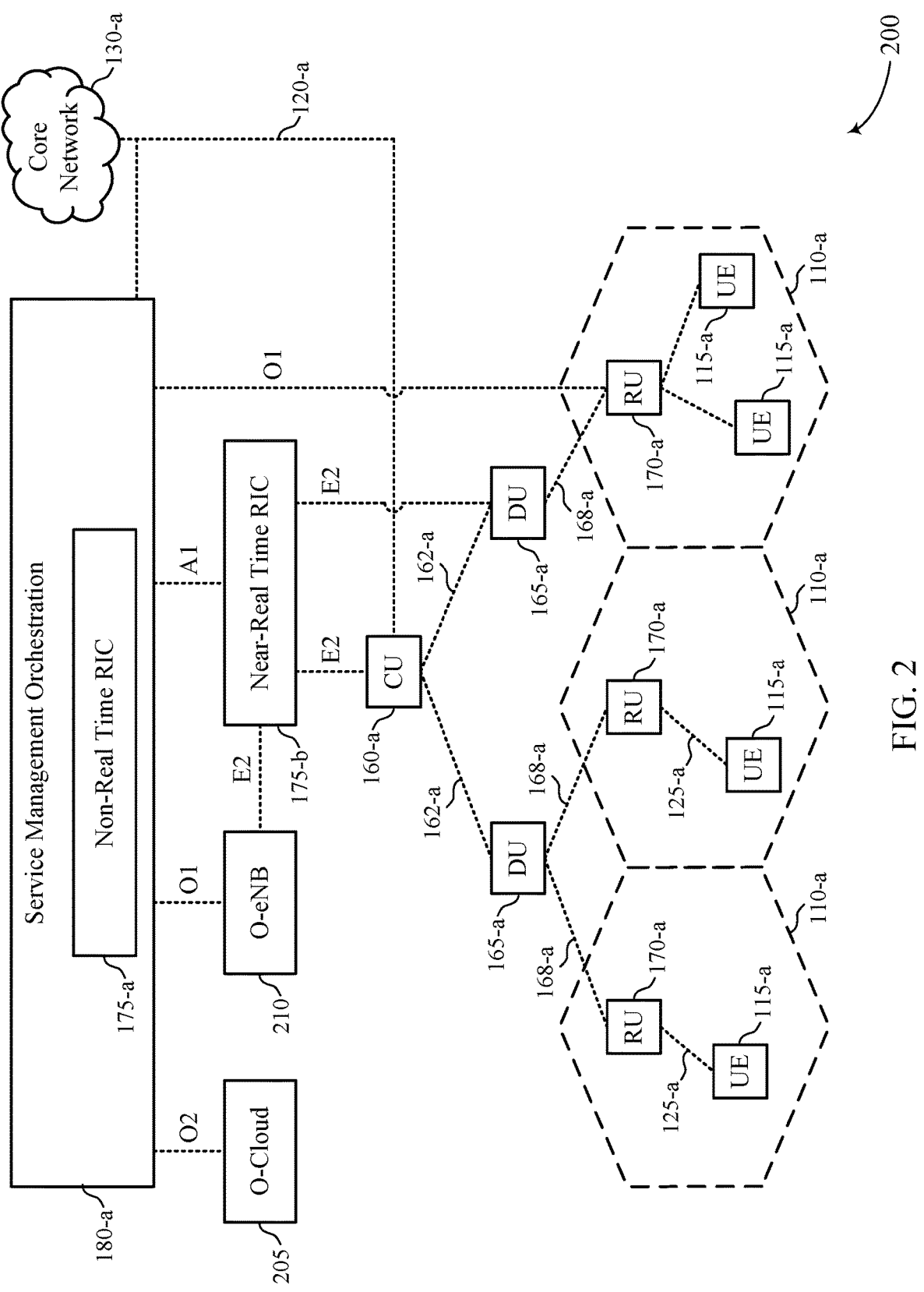
FIG. 2 illustrates an example of a network architecture that supports BWP switching techniques for network power savings in accordance with one or more aspects of the present disclosure.

FIG. 2 illustrates an example of a network architecture 200 (e.g., a disaggregated base station architecture, a disaggregated RAN architecture) that supports BWP switching techniques for network power savings in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, for example, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
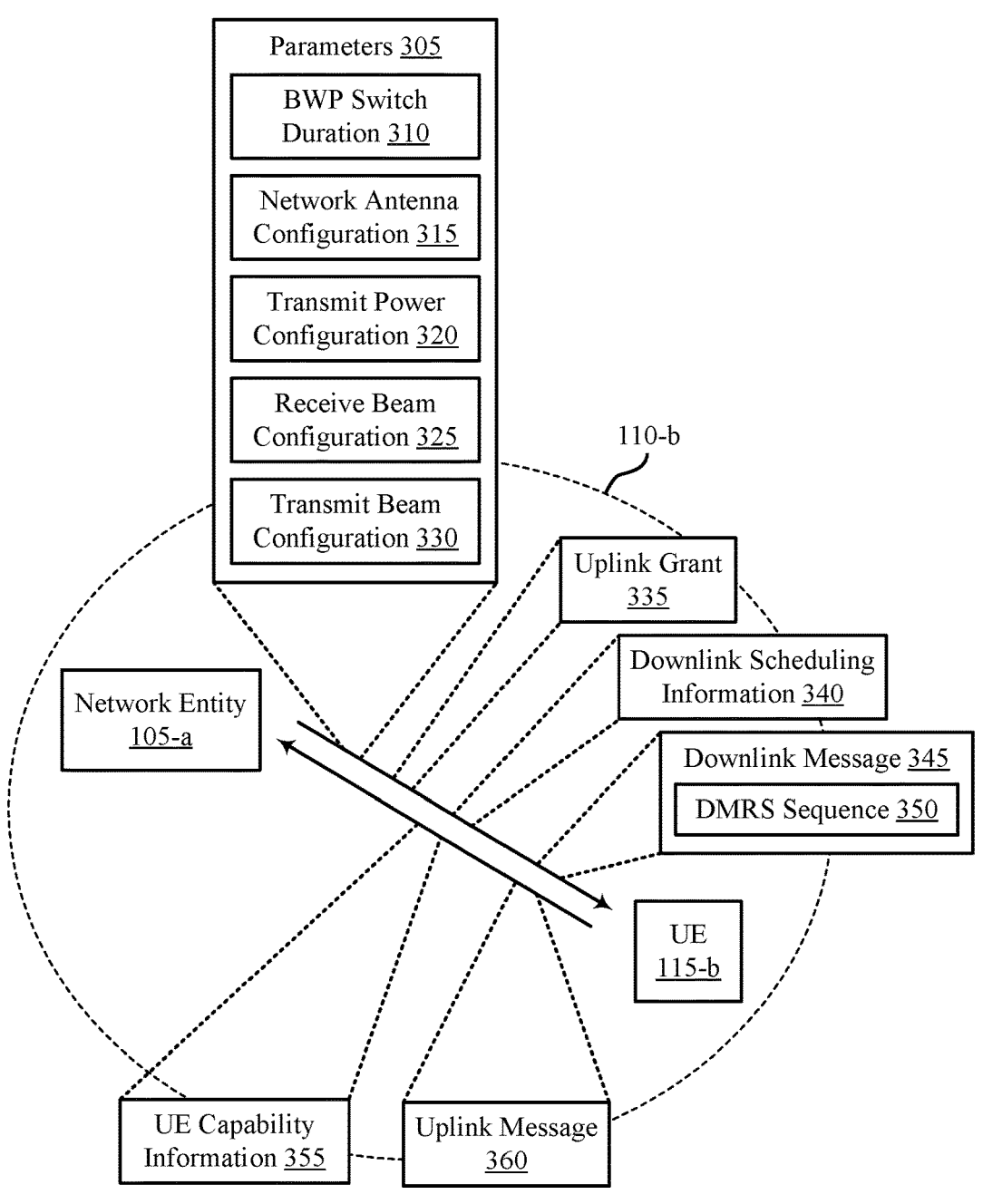
FIG. 3 illustrates an example of a wireless communications system that supports BWP switching techniques for network power savings in accordance with one or more aspects of the present disclosure.

FIG. 3 illustrates an example of a wireless communications system 300 that supports BWP switching techniques for network power savings in accordance with one or more aspects of the present disclosure. The wireless communications system 300 may implement or be implemented by aspects of wireless communications system 100 or the network architecture 200. For example, the wireless communications system 300 includes a UE 115-*b*, which may be an example of a UE 115, as described with reference to FIGS. 1 and 2. The wireless communications system 300 also includes a network entity 105-*a*, which may be an example of a network entity 105 described with reference to FIG. 1. The network entity 105-*a* and the UE 115-*b* may communicate within a coverage area 110-*b*, which may be an example of a coverage area 110 described with reference to FIG. 1. In the wireless communications system 300, the UE 115-*b* may perform a temporary BWP switch according to one or more parameters 305 provided by the network entity 105-*a* associated with a temporary BWP switch procedure.

The network entity 105-*a* may dynamically adjust settings and/or parameters used for communications with the UE 115-*b*. One mechanism for dynamically changing these parameters, such as the number of CSI-RS ports, is through BWP switching. However, frequent BWP switching may increase the complexity and overhead of communications between the UE 115-*b* and the network entity 105-*a*. In some cases, if the network entity 105-*a* experiences bursty traffic conditions, the network entity 105-*a* may dynamically configure the UE 115-*b* to switch from a first BWP to a second BWP, and may configure the UE 115-*b* to switch back to the first BWP shortly thereafter. This may result in higher signaling overhead, as the UE 115-*b* receives two separate BWP switching indications.

Rather than transmitting additional control messages to configure the UE 115-*b* to revert back to the first BWP, aspects of the present disclosure may enable the network entity 105-*a* to configure a procedure to perform a temporary BWP switch by the UE 115-*b*, which may improve the signaling overhead and processing latency associated with BWP switching operations at the UE 115-*b*. The described techniques may support mechanisms for temporary BWP switching and mechanisms for scheduling data transmissions in a temporary BWP, which may reduce the processing latency and signaling overhead of communications between the UE 115-*b* and the network entity 105-*a*. Additionally, the techniques described herein may reduce the overall complexity of CSI reporting configurations for the UE 115-*b*.

In some examples, it may be desirable to control antenna adaptation and power adaptation via BWP switching. In accordance with aspects of the present disclosure, the network entity 105-*a* may send a physical downlink shared channel (PDSCH) transmission to the UE 115-*b* using a second (temporary) BWP while remaining in a first BWP (such as a current active BWP of the network entity 105-*a*) for other operations. More specifically, the network entity 105-*a* may schedule a PDSCH transmission (such as a downlink message 345) in a temporary BWP and configure the UE 115-*b* to switch back to the previous BWP after receiving the scheduled PDSCH transmission. In some examples, the network entity 105-*a* may be capable of signaling whether a BWP switch is temporary or persistent.

In some examples, to facilitate temporary BWP switching, the UE 115-*b* may transmit UE capability information 355 to the network entity 105-*a*. The UE capability information 355 may indicate a capability of the UE 115-*b* to support BWP temporary switching operations. The UE capability information 355 may identify a quantity of BWPs for which the UE 115-*b* can support temporary switching, which may be different from the total quantity of BWPs configured for the UE 115-*b*. The UE capability information 355 may also indicate a minimum duration supported for temporary switching operations at the UE 115-*b*.

The one or more parameters 305 provided by the network entity 105-*a* may include, for example, a BWP switch duration 310, a network antenna configuration 315, a transmit power configuration 320, a receive beam configuration 325, and a transmit beam configuration 330. The BWP switch duration 310, if signaled, may indicate a quantity of frames, slots, symbols, or milliseconds for which the UE is to monitor a temporary BWP. The network antenna configuration 315 may indicate a quantity of antenna ports (such as CSI-RS antenna ports) the network entity 105-*a* intends to use for transmission of a downlink message 345. Likewise, the transmit power configuration 320 may indicate a transmit power the network entity 105-*a* intends to use for transmission of the downlink message 345.

The receive beam configuration 325 may, in some examples, indicate a quantity or orientation of communication beams to use for reception of the downlink message 345 from the network entity 105-*a*. Likewise, the transmit beam configuration 330 may indicate a quantity or orientation of communication beams the network entity 105-*a* intends to use for transmission of the downlink message 345 (e.g., a PDSCH transmission). In some examples, the downlink message 345 may include a DMRS sequence 350 that indicates whether a BWP switch is temporary or persistent. Additionally, or alternatively, the one or more parameters 305 may indicate one or more of a transmit power, a transmit beam configuration, or an antenna configuration to use for uplink communications scheduled in the temporary BWP.

In some examples, the network entity 105-*a* may provide the UE 115-*b* with an uplink grant 335 to use for uplink communications in the temporary BWP. Accordingly, the UE 115-*b* may transmit an uplink message 360 using physical uplink shared channel (PUSCH) resources indicated by the uplink grant 335. Additionally, or alternatively, the network entity 105-*a* may transmit downlink scheduling information 340 to the UE 115-*b*. The UE 115-*b* may, in some examples, receive the downlink message 345 via PDSCH resources indicated by the downlink scheduling information 340. After transmitting the uplink message 360 (in accordance with the uplink grant 335) or receiving the downlink message 345 (in accordance with the downlink scheduling information 340), the UE 115-*b* may, in some examples, switch back to the first (initial) BWP or switch to a third BWP that is different from the first BWP.

Figure 4:
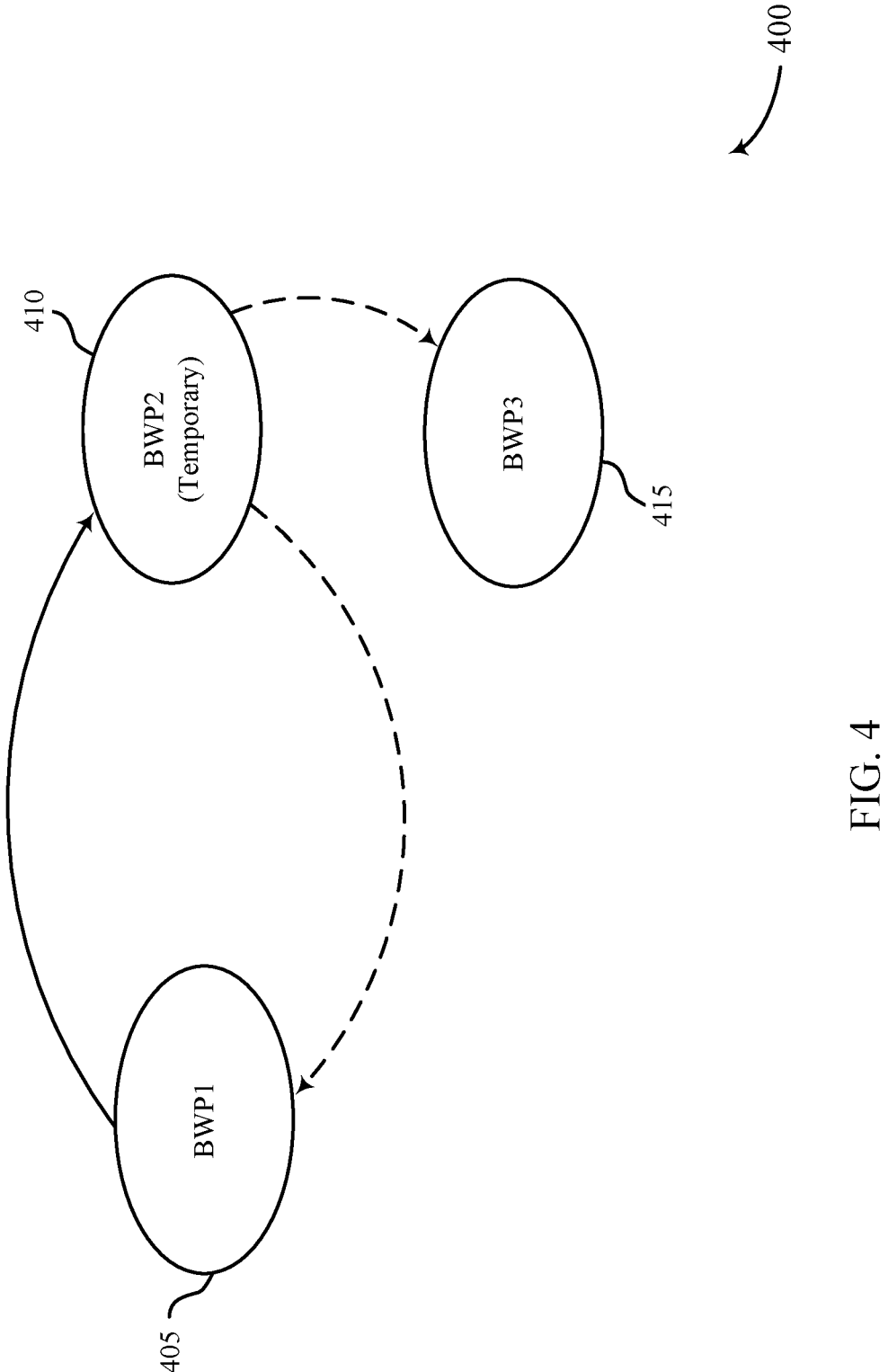
FIGS. 4 and 5 illustrate examples of resource diagrams that support BWP switching techniques for network power savings in accordance with one or more aspects of the present disclosure.

FIG. 4 illustrates an example of a resource diagram 400 that supports BWP switching techniques for network power savings in accordance with one or more aspects of the present disclosure. The resource diagram 400 may implement or be implemented by aspects of any of the wireless communications systems or system architectures described with reference to FIGS. 1 through 3. For example, the resource diagram 400 may be implemented by a UE, such as the UE 115-*b* described with reference to FIG. 3. In the example of FIG. 4, the UE may receive an instruction to temporarily switch from a BWP 405 to a BWP 410 for a time duration. Accordingly, the UE may switch to the BWP 410 (a temporary BWP) and communicate with a network entity (such as the network entity 105-*a* described with reference to FIG. 3) for the specified time duration. In some examples, the UE may switch back to the BWP 405 after the time duration has elapsed. In other examples, the UE may switch to a BWP 415 after the time duration has elapsed.

As described herein with reference to FIGS. 1 through 3, the UE may receive an indication of one or more parameters (such as the parameters 305 described with reference to FIG. 3) for a temporary BWP switch from the BWP 405 (BWP1) to the BWP 410 (BWP2). The one or more parameters associated with a temporary BWP switch procedure may indicate a time duration for the temporary BWP switch, a network antenna configuration for the BWP 410, a transmit power for a PDSCH transmission scheduled in the BWP 410, a receive beam to use for reception of the PDSCH transmission, a transmit beam used for the PDSCH transmission, or a combination thereof. In some examples, the UE may also receive an uplink grant indicating one or more PUSCH resources to use for an uplink transmission in the BWP 410.

Accordingly, the UE may receive a downlink message from the network entity via PDSCH resources in the BWP 410 and/or transmit an uplink message to the network entity via PUSCH resources in the BWP 410 after switching from the BWP 405 to the BWP 410 in accordance with the one or more parameters associated with the temporary BWP switch procedure. The UE may switch back to the BWP 405 or switch to the BWP 415 (BWP3) after performing all scheduled communications or after a time duration of the temporary BWP switch has elapsed. The UE may determine whether to switch back to the BWP 405, continue monitoring the BWP 410, or switch to the BWP 415 based on a DCI indication from the network entity, an RRC configuration associated with the BWP 410, a DMRS sequence in a PDSCH transmission from the network entity, an MCS associated with the PDSCH transmission, an FDRA associated with the PDSCH transmission, a TDRA associated with the PDSCH transmission, a number of layers used for the PDSCH transmission, or a combination thereof.

The network entity may instruct the UE to switch from the BWP 405 to the BWP 410 for one or more symbols, slots, frames, or milliseconds. In some examples, this instruction may be signaled in an RRC configuration for the BWP 410. In other examples, this instruction may be conveyed to the UE via dynamic signaling, such as a DCI message or a MAC-control element (MAC-CE). Additionally, or alternatively, the UE may receive an indication of whether the BWP 410 is a temporary BWP. In other words, if the BWP 410 is configured as a temporary BWP and the UE receives an indication to switch to the BWP 410 (for example, while monitoring the BWP 405), the UE may switch back to the BWP 405 or switch to the BWP 415 (another RRC-configured BWP) after a time duration (for example, the BWP switch duration 310 described with reference to FIG. 3) specified in the RRC configuration for the BWP 410.

A temporary BWP switching indication (transmitted by means of a DCI message or a MAC-CE) may provide the UE with a time duration of the temporary BWP switch. Thus, in some examples, the UE may determine whether a BWP switch is temporary or persistent based on whether the UE receives an indication of a time duration for the BWP switch. If, for example, the temporary BWP switching indication is signaled to the UE via DCI, a quantity of bits (for example, two bits) in the DCI may correspond to an entry of an RRC-configured table that identifies whether a BWP is temporary and/or a temporary BWP switch duration. For example, a value of 00 may indicate that a BWP switch is persistent, a value of 01 may indicate a temporary BWP switch duration of 4 slots, a value of 10 may indicate a temporary BWP switch duration of 8 slots, and a value of 11 may indicate a temporary BWP switch duration of 20 slots.

Although the temporary BWP switching mechanisms disclosed herein are illustrated and described in the context of uplink and downlink communications between a UE and a network entity (for example, over a Uu communication link), it is to be understood that aspects of the present disclosure are also applicable to sidelink communications between two UEs (for example, over a PC5 communication link) and/or PC5-based UE-to-network relay scenarios in which a first UE serves as a relay device between a second UE and a network entity. In such examples, a sidelink UE may receive a temporary BWP switching indication via an instance of sidelink control information (SCI) from another sidelink UE.

Thus, in some cases, a temporary BWP switching indication may be applicable to sidelink communications between two UEs. For example, a first sidelink UE may receive, via the BWP 405 (BWP1), an indication of one or more parameters associated with a temporary BWP switch procedure, where the one or more parameters are to be used for sidelink communications between the first sidelink UE and a second sidelink UE in the BWP 410 (BWP2). The first sidelink UE may receive the indication from the second sidelink UE (for example, over a PC5 connection) or from a network entity (for example, over a Uu interface). Accordingly, the first sidelink UE may switch from the BWP 405 to the BWP 410 and use the one or more parameters to perform sidelink communications with the second sidelink UE via resources in the BWP 410. In some examples, the first sidelink UE may switch back to the BWP 405 after a time duration and continue communicating with the second sidelink UE via resources in the BWP 405. In other examples, the first sidelink UE may switch to the BWP 415 (BWP3) and perform sidelink communications with the second sidelink UE via resources in the BWP 415.

One or more aspects of the resource diagram 400 may support techniques for reducing the overall latency, power consumption, and signaling overhead of BWP switching operations at the UE. For example, the techniques and signaling mechanisms described with reference to FIG. 4 may enable the UE to perform multiple BWP switches based on a single instance of DCI from the network entity, as opposed to the network entity transmitting another instance of DCI for each subsequent BWP switch. As a result, the network entity may transmit fewer control messages to the UE, which may result in greater power savings and reduced signaling overhead at the network entity. Moreover, the UE may allocate fewer processing resources to receiving and decoding control messages from the network entity, which may result in lower processing latency and reduced power consumption at the UE.

Figure 5:

FIG. 5 illustrates an example of a resource diagram 500 that supports BWP switching techniques for network power savings in accordance with one or more aspects of the present disclosure. The resource diagram 500 may implement or be implemented by aspects of any of the wireless communications systems, network architectures, or resource diagrams described with reference to FIGS. 1 through 4. For example, the resource diagram 500 includes a BWP 505 (BWP1), which may be an example of the BWP 405 described with reference to FIG. 4. The resource diagram 500 also includes a BWP 510 (BWP2), which may be an example of the BWP 410 described with reference to FIG. 4. In the example of FIG. 5, a UE (such as the UE 115-*b* described with reference to FIG. 3) may receive a PDSCH transmission from a network entity (such as the network entity 105-*a* described with reference to FIG. 3) after switching from the BWP 505 to the BWP 510 in accordance with any of the temporary BWP switching procedures discussed in FIGS. 1 through 4. In some cases, the UE 115-*b* may be preconfigured with a particular temporary BWP switching procedure to use, or the network entity 105-*a* may signal which temporary BWP switching procedure that the UE 115-*b* is to apply.

As described herein with reference to FIGS. 1 through 4, which include examples of temporary BWP switching procedures, the UE may receive an indication of one or more parameters (such as the parameters 305 described with reference to FIG. 3) to use for a temporary BWP switch from the BWP 505 to the BWP 510. The one or more parameters may include a time duration 540 for the temporary BWP switch, a network antenna configuration for the BWP 510, a transmit power for a PDSCH transmission 530 scheduled in the BWP 510, a receive beam to use for reception of the PDSCH transmission 530, a transmit beam used for the PDSCH transmission 530, or a combination thereof. Accordingly, the UE may receive the PDSCH transmission 530 from the network entity via the BWP 510 after switching from the BWP 505 to the BWP 510 during a switching gap 525. In some examples, the UE may switch back to the BWP 505 during a switching gap 535 after receiving the PDSCH transmission 530 from the network entity or after the time duration 540 has elapsed.

The network entity may configure the UE to temporarily switch from the BWP 505 to the BWP 510 if, for example, channel conditions (such as SINR, RSRP, CQI, RSSI) associated with the BWP 505 deteriorate or if channel conditions associated with the BWP 510 improve relative to the channel conditions associated with the BWP 505. Additionally, or alternatively, the network entity may configure the UE to temporarily switch from the BWP 505 to the BWP 510 such that the network entity can transmit a PDSCH transmission 530 to the UE and/or receive a PUSCH transmission from the UE via the BWP 510. The network entity may configure temporary BWP switching behaviors for the UE using a combination of semi-static signaling (such as an RRC message 515) and dynamic signaling (such as a DCI message or a MAC-CE).

Any BWP can be a temporary BWP if the network entity designates the BWP as a temporary BWP. In some examples, an instance of DCI 520 may include an instruction to switch from the BWP 505 to the BWP 510 and/or an indication that a switch from the BWP 505 to the BWP 510 is temporary. In some examples, the network entity may indicate whether a BWP switch is temporary using a reserved bit or an extra bit in the instance of DCI 520. The bit used to signal the temporary BWP switching indication may, in some examples, be toggled by the network entity. For example, the network entity may indicate a temporary BWP switch by toggling a DCI bit from a first value (0) to a second value (1). Additionally, or alternatively, the network entity may automatically trigger a temporary BWP switch for the UE by setting a DCI bit to a specific value. In other examples, the network entity may indicate whether a BWP switch is temporary via a DMRS sequence in the PDSCH transmission 530 scheduled in the BWP 510. Upon detecting the DMRS sequence in the PDSCH transmission 530, the UE may determine that the BWP 510 is a temporary BWP and/or that the UE is to switch back to the BWP 505 after receiving the PDSCH transmission 530.

The time duration 540 of the BWP switch (if temporary) may be RRC-configured per BWP or per cell. Thus, the time duration 540 for which the UE monitors the BWP 510 may be specific to an RRC configuration of the BWP 510. In some examples, the UE may determine that a BWP switch is temporary if the PDSCH transmission 530 (a downlink message) is scheduled with specific RRC-configured parameters. For example, if the UE receives an indication to switch from the BWP 505 to the BWP 510 such that the UE can receive the PDSCH transmission 530, the UE may implicitly determine that the BWP switch is temporary based on an MCS, a number of layers, a TDRA value, or an FDRA value associated with the PDSCH transmission 530. A duration of the BWP switch may be based on various factors, such as MCS, number of layers, TDRA, FDRA, DCI indication, DMRS sequence, RRC configuration, etc.

One or more aspects of the resource diagram 500 may support techniques for reducing the overall latency, power consumption, and signaling overhead of BWP switching operations at the UE. For example, the techniques and signaling mechanisms described with reference to FIG. 5 may enable the UE to perform multiple BWP switches based on a single instance of DCI 520 from the network entity, as opposed to the network entity transmitting another instance of DCI 520 for each subsequent BWP switch. As a result, the network entity may transmit fewer control messages to the UE, which may result in greater power savings and reduced signaling overhead at the network entity. Moreover, the UE may allocate fewer processing resources to receiving and decoding control messages from the network entity, which may result in lower processing latency and reduced power consumption at the UE.

Figure 6:
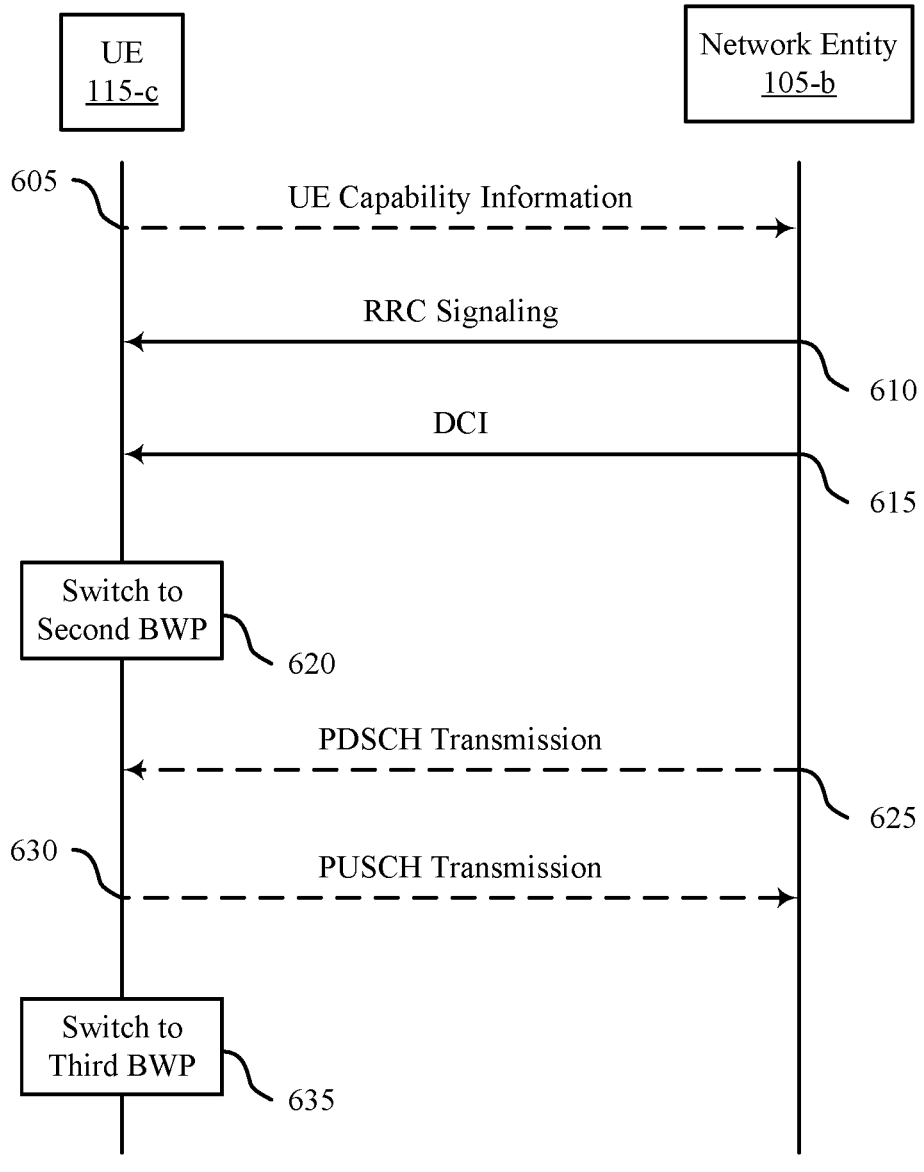
FIG. 6 illustrates an example of a process flow that supports BWP switching techniques for network power savings in accordance with one or more aspects of the present disclosure.

FIG. 6 illustrates an example of a process flow 600 that supports BWP switching techniques for network power savings in accordance with one or more aspects of the present disclosure. The process flow 600 may implement or be implemented by aspects of any of the wireless communications systems, network architectures, or resource diagrams described with reference to FIGS. 1 through 5. For example, the process flow 600 includes a UE 115-*c*, which may be an example of a UE 115, as described herein with reference to FIGS. 1 through 5. The process flow 600 also includes a network entity 105-*b*, which may be an example of a network entity 105, as described herein with reference to FIGS. 1 through 5. In the following description of the process flow 600, operations between the UE 115-*c* and the network entity 105-*b* may be added, omitted, or performed in a different order (with respect to the exemplary order shown).

At 605, the UE 115-*c* may transmit UE capability information (for example, the UE capability information 355 described with reference to FIG. 3) to the network entity 105-*b*. The UE capability information may indicate whether the UE 115-*c* supports temporary BWP switching and, if so, a number of BWPs for which the UE 115-*c* can support temporary BWP switching, which may be the same or different from a number of BWPs configured for the UE 115-*c*. The UE capability information may also indicate a shortest time duration supported by the UE 115-*c* for temporary BWP switching. The UE 115-*c* may signal the UE capability information to the network entity 105-*b* via one or more RRC IEs.

At 610, the UE 115-*c* may receive RRC signaling from the network entity 105-*b*. The RRC signaling may indicate respective configurations for one or more BWPs supported by the UE 115-c for a temporary BWP switch procedure. For example, the RRC signaling may indicate a first configuration for a first BWP supported by the UE 115-c and a second configuration for a second BWP supported by the UE 115-c. The first configuration may include an identifier of the first BWP, a frequency range associated with the first BWP, locations of different channels (such as uplink shared channels or downlink control channels) within the first BWP, etc. Likewise, the second configuration may include an identifier of the second BWP, a frequency range associated with the second BWP, and locations of different channels (for example, uplink control channels, downlink shared channels) in the second BWP. In some examples, the second configuration may indicate that the second BWP is a temporary BWP. If the second BWP is configured as a temporary BWP, the second configuration may also indicate a time duration for which to monitor the second (temporary) BWP.

At 615, the UE 115-c may receive an instance of DCI (such as the DCI 520 described with reference to FIG. 5) from the network entity 105-b. The instance of DCI may indicate a temporary BWP switching command (also referred to herein as a temporary BWP switching indication) for the UE 115-c. In some examples, one or more bits in the DCI may correspond to an index of an RRC-configured table that includes a list of possible BWP switching parameters. Accordingly, the UE 115-c may determine one or more BWP switching parameters (for example, a target BWP, a time duration, antenna information) for the temporary BWP switch procedure for the UE 115-c to use based on the one or more bits signaled in the DCI. In some examples, the instance of DCI may include downlink scheduling information (for example, the downlink scheduling information 340 described with reference to FIG. 4) that schedules a PDSCH transmission for the UE 115-c in the second BWP.

At 620, the UE 115-c may switch from the first BWP (for example, the BWP 405 described with reference to FIG. 4) to the second BWP (for example, the BWP 410 described with reference to FIG. 4) in accordance with the temporary BWP switching command from the network entity 105-b. In some examples, the UE 115-c may determine that a switch from the first BWP to the second BWP is temporary based on an RRC configuration of the second BWP (for example, if the second BWP is configured as a temporary BWP), an MCS associated with a PDSCH transmission scheduled in the second BWP, an FDRA index associated with a PDSCH transmission scheduled in the second BWP, a number of layers associated with a PDSCH transmission scheduled in the second BWP, a DCI indication from the network entity 105-b, or a combination thereof.

At 625, the UE 115-c may, in some examples, receive a PDSCH transmission (such as the downlink message 345 described with reference to FIG. 3) from the network entity 105-b via a set of time and frequency resources in the second BWP. In some examples, the PDSCH transmission may include a DMRS sequence (for example, the DMRS sequence 350 described with reference to FIG. 3) that indicates whether a switch from the first BWP to the second BWP is temporary and/or whether the second BWP is a temporary BWP. At 630, the network entity 105-b may optionally receive a PUSCH transmission (for example, the uplink message 360 described with reference to FIG. 3) from the UE 115-c via a set of time and frequency resources in the second BWP. The UE may transmit the PUSCH transmission in accordance with an uplink grant (such as the uplink grant 335 described with reference to FIG. 3) provided by the network entity 105-b.

At 635, the UE 115-c may switch from the second (temporary) BWP to a third BWP in accordance with the temporary BWP switching indication. For example, the UE 115-c may switch from the second BWP to the third BWP after receiving one or more downlink messages from the network entity 105-b and/or transmitting one or more uplink messages to the network entity 105-b via resources in the second BWP. Additionally, or alternatively, the UE 115-c may switch from the second BWP to the third BWP after a time duration signaled by the temporary BWP switching indication. For example, the UE 115-c may switch to the third BWP after monitoring the second BWP for a quantity of symbols, slots, frames, or milliseconds indicated by the temporary BWP switching command. In some examples, the third BWP may be the same as the first BWP, in which case the UE 115-c may switch back to the first BWP in accordance with the temporary BWP switching indication.

Figure 7:
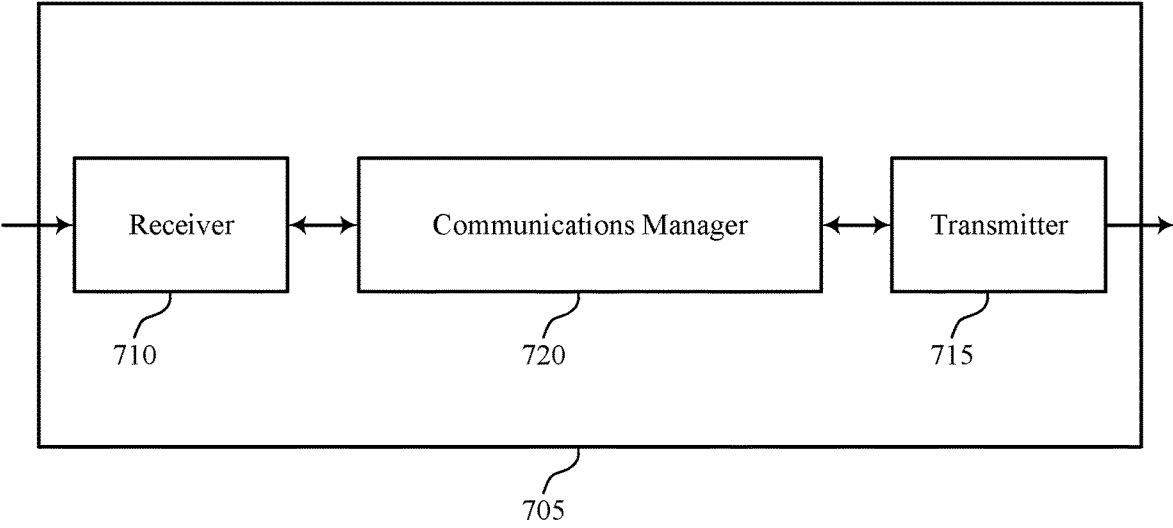
FIGS. 7 and 8 show block diagrams of devices that support BWP switching techniques for network power savings in accordance with one or more aspects of the present disclosure.

FIG. 7 shows a block diagram 700 of a device 705 that supports BWP switching techniques for network power savings in accordance with one or more aspects of the present disclosure. The device 705 may be an example of aspects of a UE 115, as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to BWP switching techniques for network power savings). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to BWP switching techniques for network power savings). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of BWP switching techniques for network power savings as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE (such as the device 705) in accordance with examples as disclosed herein. For example, the communications manager 720 may be configured as or otherwise support a means for receiving, via a first BWP, an indication of one or more parameters associated with a temporary BWP switch procedure, the one or more parameters to be used for communications scheduled in a second BWP that is different from the first BWP. The communications manager 720 may be configured as or otherwise support a means for communicating with a network entity via the second BWP based on a switch from the first BWP to the second BWP in accordance with the one or more parameters associated with the temporary BWP switch procedure. The communications manager 720 may be configured as or otherwise support a means for communicating with the network entity via a third BWP based on a switch from the second BWP to the third BWP in accordance with the one or more parameters associated with the temporary BWP switch procedure.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, and reduced signaling overhead by enabling the device 705 to perform a temporary BWP switch according to one or more parameters provided by a network entity.

Figure 8:
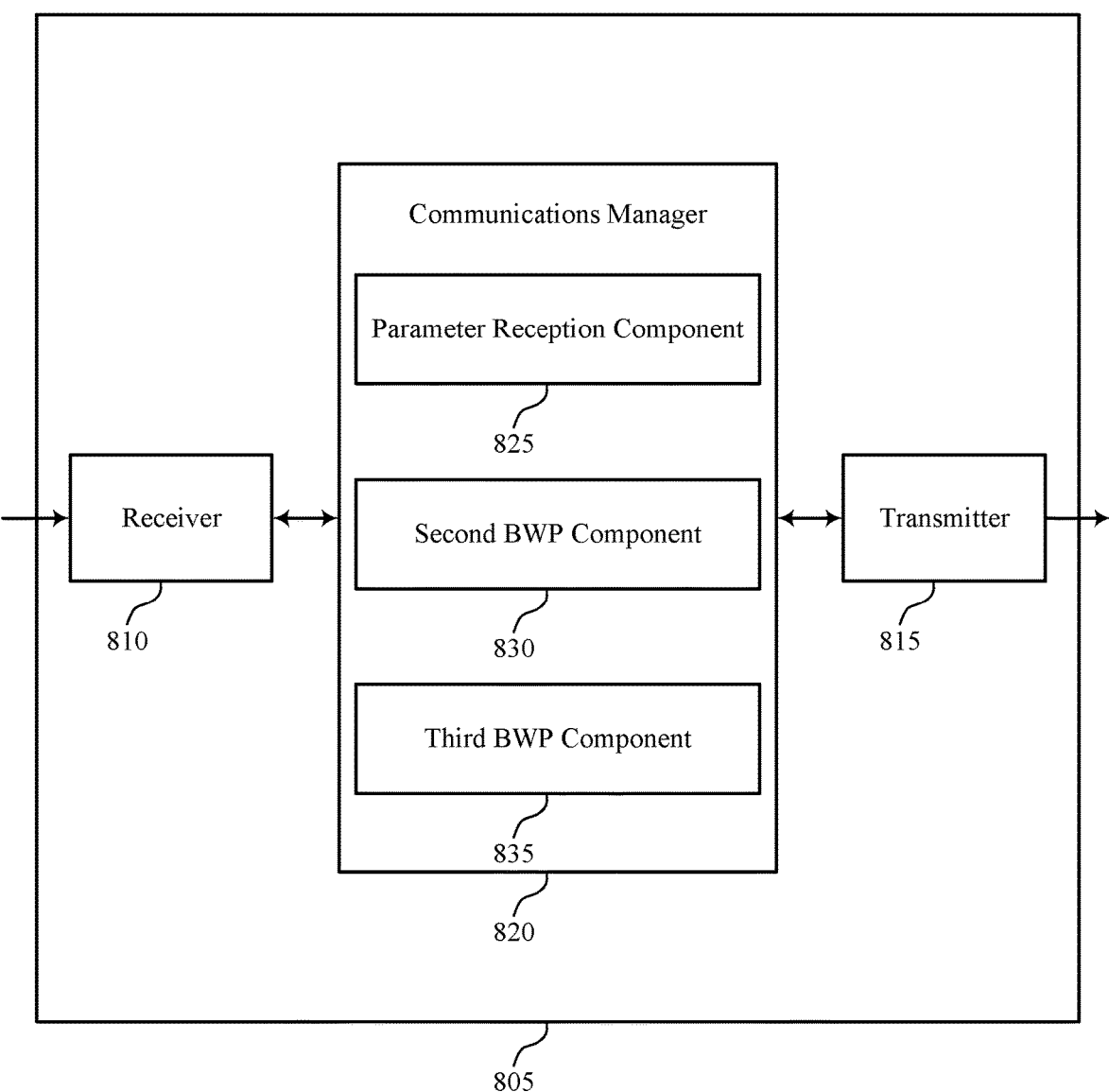

FIG. 8 shows a block diagram 800 of a device 805 that supports BWP switching techniques for network power savings in accordance with one or more aspects of the present disclosure. The device 805 may be an example of aspects of a device 705 or a UE 115, as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to BWP switching techniques for network power savings). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to BWP switching techniques for network power savings). In some examples, the transmitter 815 may be co-located with a receiver 810 in a transceiver module. The transmitter 815 may utilize a single antenna or a set of multiple antennas.

The device 805, or various components thereof, may be an example of means for performing the BWP switching techniques described herein. For example, the communications manager 820 may include a parameter reception component 825, a second BWP component 830, a third BWP component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE (such as the device 805) in accordance with examples as disclosed herein. The parameter reception component 825 may be configured as or otherwise support a means for receiving, via a first BWP, an indication of one or more parameters associated with a temporary BWP switch procedure, the one or more parameters to be used for communications scheduled in a second BWP that is different from the first BWP. The second BWP component 830 may be configured as or otherwise support a means for communicating with a network entity via the second BWP based on a switch from the first BWP to the second BWP in accordance with the one or more parameters associated with the temporary BWP switch procedure. The third BWP component 835 may be configured as or otherwise support a means for communicating with the network entity via a third BWP based on a switch from the second BWP to the third BWP in accordance with the one or more parameters associated with the temporary BWP switch procedure.

Figure 9:
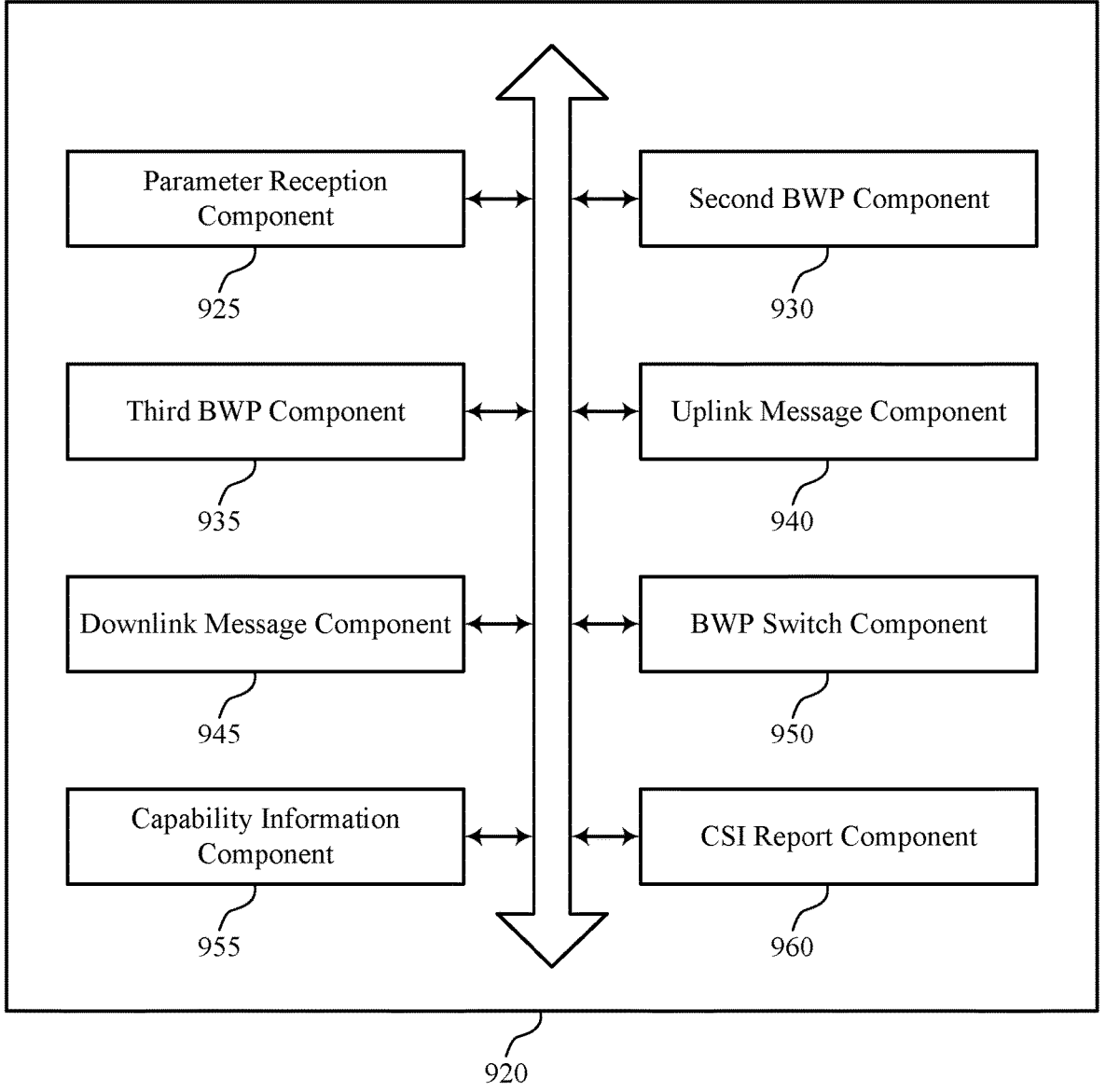
FIG. 9 shows a block diagram of a communications manager that supports BWP switching techniques for network power savings in accordance with one or more aspects of the present disclosure.

FIG. 9 shows a block diagram 900 of a communications manager 920 that supports BWP switching techniques for network power savings in accordance with one or more aspects of the present disclosure. The communications manager 920 may be an example of aspects of a communications manager 720, a communications manager 820, or both, as described herein. The communications manager 920, or various components thereof, may be an example of means for performing various aspects of BWP switching techniques for network power savings as described herein. For example, the communications manager 920 may include a parameter reception component 925, a second BWP component 930, a third BWP component 935, an uplink message component 940, a downlink message component 945, a BWP switch component 950, a capability information component 955, a CSI report component 960, or any combination thereof. Each of these components may communicate, directly or indirectly, with one another (e.g., via one or more buses).

The communications manager 920 may support wireless communication at a UE (such as the UE 115-*b* described with reference to FIG. 3) in accordance with examples as disclosed herein. The parameter reception component 925 may be configured as or otherwise support a means for receiving, via a first BWP, an indication of one or more parameters associated with a temporary BWP switch procedure, the one or more parameters to be used for communications scheduled in a second BWP that is different from the first BWP. The second BWP component 930 may be configured as or otherwise support a means for communicating with a network entity via the second BWP based on a switch from the first BWP to the second BWP in accordance with the one or more parameters associated with the temporary BWP switch procedure. The third BWP component 935 may be configured as or otherwise support a means for communicating with the network entity via a third BWP based on a switch from the second BWP to the third BWP in accordance with the one or more parameters associated with the temporary BWP switch procedure.

In some examples, the one or more parameters indicate a quantity of symbols, slots, frames, or milliseconds for the UE to monitor the second BWP in accordance with the temporary BWP switch procedure.

In some examples, the one or more parameters indicate at least one of an antenna configuration, a transmit power configuration, a transmit beam configuration, or a receive beam configuration for the communications scheduled in the second BWP.

In some examples, to support receiving the indication of the one or more parameters, the parameter reception component 925 may be configured as or otherwise support a means for receiving, via the first BWP, a control message that indicates the second BWP is a temporary BWP.

In some examples, the uplink message component 940 may be configured as or otherwise support a means for transmitting an uplink message to the network entity via the second BWP in accordance with an uplink grant provided by the network entity.

In some examples, the downlink message component 945 may be configured as or otherwise support a means for receiving a downlink message from the network entity via the second BWP in accordance with the one or more parameters associated with the temporary BWP switch procedure. In some examples, the downlink message includes a DMRS sequence that indicates the second BWP is a temporary BWP.

In some examples, to support receiving the indication of the one or more parameters, the parameter reception component 925 may be configured as or otherwise support a means for receiving an RRC message that indicates a configuration for one or more of the first BWP, the second BWP, and the third BWP.

In some examples, to support receiving the indication of the one or more parameters, the parameter reception component 925 may be configured as or otherwise support a means for receiving an instance of DCI that indicates whether a BWP switch from the first BWP to the second BWP is a temporary BWP switch.

In some examples, to support receiving the indication of the one or more parameters, the parameter reception component 925 may be configured as or otherwise support a means for receiving an instance of DCI that indicates a time duration for a temporary BWP switch from the first BWP to the second BWP.

In some examples, the downlink message component 945 may be configured as or otherwise support a means for receiving, via the second BWP, at least one downlink message within the time duration indicated by the instance of DCI.

In some examples, the uplink message component 940 may be configured as or otherwise support a means for transmitting, via the second BWP, at least one uplink message within the time duration indicated by the instance of DCI. In some examples, the one or more parameters indicate the time duration for the temporary BWP switch per BWP or per cell.

In some examples, the BWP switch component 950 may be configured as or otherwise support a means for switching from the second BWP to the third BWP within a time gap indicated by the one or more parameters associated with the temporary BWP switch procedure.

In some examples, the second BWP component 930 may be configured as or otherwise support a means for receiving information associated with a downlink transmission scheduled in the second BWP, where the information indicates that the second BWP is a temporary BWP.

In some examples, the information includes one or more of an MCS, a quantity of layers, a TDRA index, or an FDRA index associated with the downlink transmission scheduled in the second BWP. In some examples, the information indicates a time duration for the UE to monitor the temporary BWP.

In some examples, the capability information component 955 may be configured as or otherwise support a means for transmitting a message that indicates one or more of a capability of the UE to perform a temporary BWP switch, a quantity of BWPs supported for the temporary BWP switch, or a minimum time duration supported for the temporary BWP switch.

In some examples, the CSI report component 960 may be configured as or otherwise support a means for transmitting an indication of a CSI report based on one or more CSI-RSs received via the second BWP, the CSI report generated in accordance with the one or more parameters associated with the temporary BWP switch procedure.

In some examples, the downlink message component 945 may be configured as or otherwise support a means for receiving a downlink message via the second BWP in accordance with the temporary BWP switch procedure.

In some examples, the downlink message component 945 may be configured as or otherwise support a means for decoding the downlink message based on the one or more parameters associated with the temporary BWP switch procedure. In some examples, the third BWP includes the first BWP. In some examples, the UE further includes one or more interfaces coupled with one or more antennas.

Figure 10:
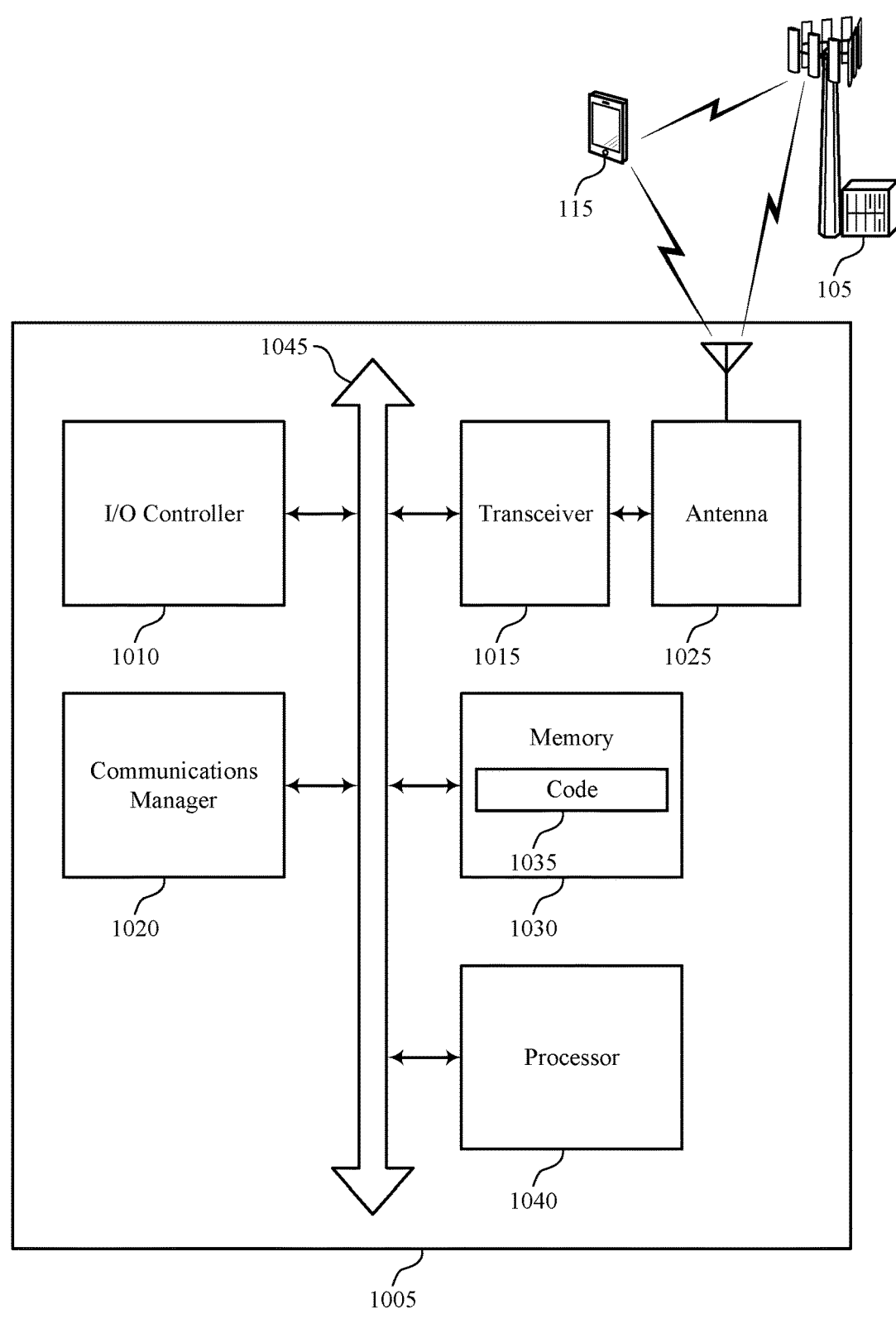
FIG. 10 shows a diagram of a system including a device that supports BWP switching techniques for network power savings in accordance with one or more aspects of the present disclosure.

FIG. 10 shows a diagram of a system 1000 including a device 1005 that supports BWP switching techniques for network power savings in accordance with one or more aspects of the present disclosure. The device 1005 may be an example of or include the components of a device 705, a device 805, or a UE 115, as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals that are separate from the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may be indirectly executable by the processor 1040, and may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting BWP switching techniques for network power savings). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE (such as the device 1005) in accordance with examples as disclosed herein. For example, the communications manager 1020 may be configured as or otherwise support a means for receiving, via a first BWP, an indication of one or more parameters associated with a temporary BWP switch procedure, the one or more parameters to be used for communications scheduled in a second BWP that is different from the first BWP. The communications manager 1020 may be configured as or otherwise support a means for communicating with a network entity via the second BWP based on a switch from the first BWP to the second BWP in accordance with the one or more parameters associated with the temporary BWP switch procedure. The communications manager 1020 may be configured as or otherwise support a means for communicating with the network entity via a third BWP based on a switch from the second BWP to the third BWP in accordance with the one or more parameters associated with the temporary BWP switch procedure.

By including or configuring the communications manager 1020 in accordance with examples as described herein, the device 1005 may support techniques for reduced processing latency and lower signaling overhead by enabling the device 1005 to perform multiple BWP switches based on a single instance of DCI from a network entity, as opposed receiving an instance of DCI for each BWP switch. As a result, the device 1005 may allocate fewer processing resources to receiving and decoding control messages from the network entity, which may result in lower processing latency and reduced power consumption at the device 1005.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of BWP switching techniques for network power savings as described herein, or the processor 1040 and the memory 1030 may be otherwise configured to perform or support such operations.

Figure 11:
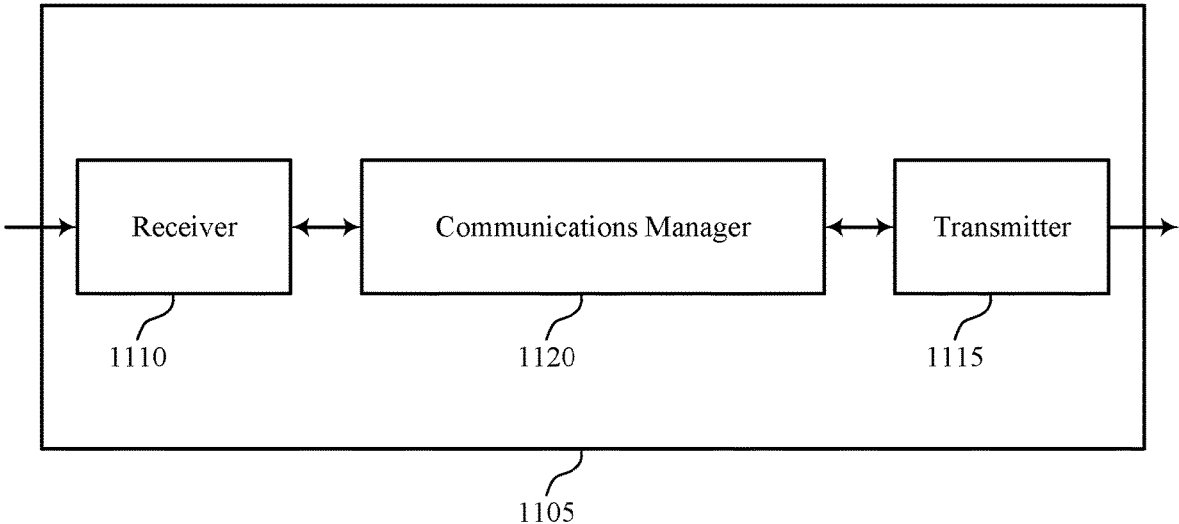
FIGS. 11 and 12 show block diagrams of devices that support BWP switching techniques for network power savings in accordance with one or more aspects of the present disclosure.

FIG. 11 shows a block diagram 1100 of a device 1105 that supports BWP switching techniques for network power savings in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of BWP switching techniques for network power savings as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity (such as the device 1105) in accordance with examples as disclosed herein. For example, the communications manager 1120 may be configured as or otherwise support a means for outputting, via a first BWP, an indication of one or more parameters associated with a temporary BWP switch procedure, the one or more parameters to be used for communications scheduled in a second BWP that is different from the first BWP. The communications manager 1120 may be configured as or otherwise support a means for communicating via the second BWP based on a switch from the first BWP to the second BWP in accordance with the one or more parameters associated with the temporary BWP switch procedure. The communications manager 1120 may be configured as or otherwise support a means for communicating via a third BWP based on a switch from the second BWP to the third BWP in accordance with the one or more parameters associated with the temporary BWP switch procedure.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, and lower signaling overhead by enabling the device 1105 to configure a temporary BWP switch for a UE.

Figure 12:
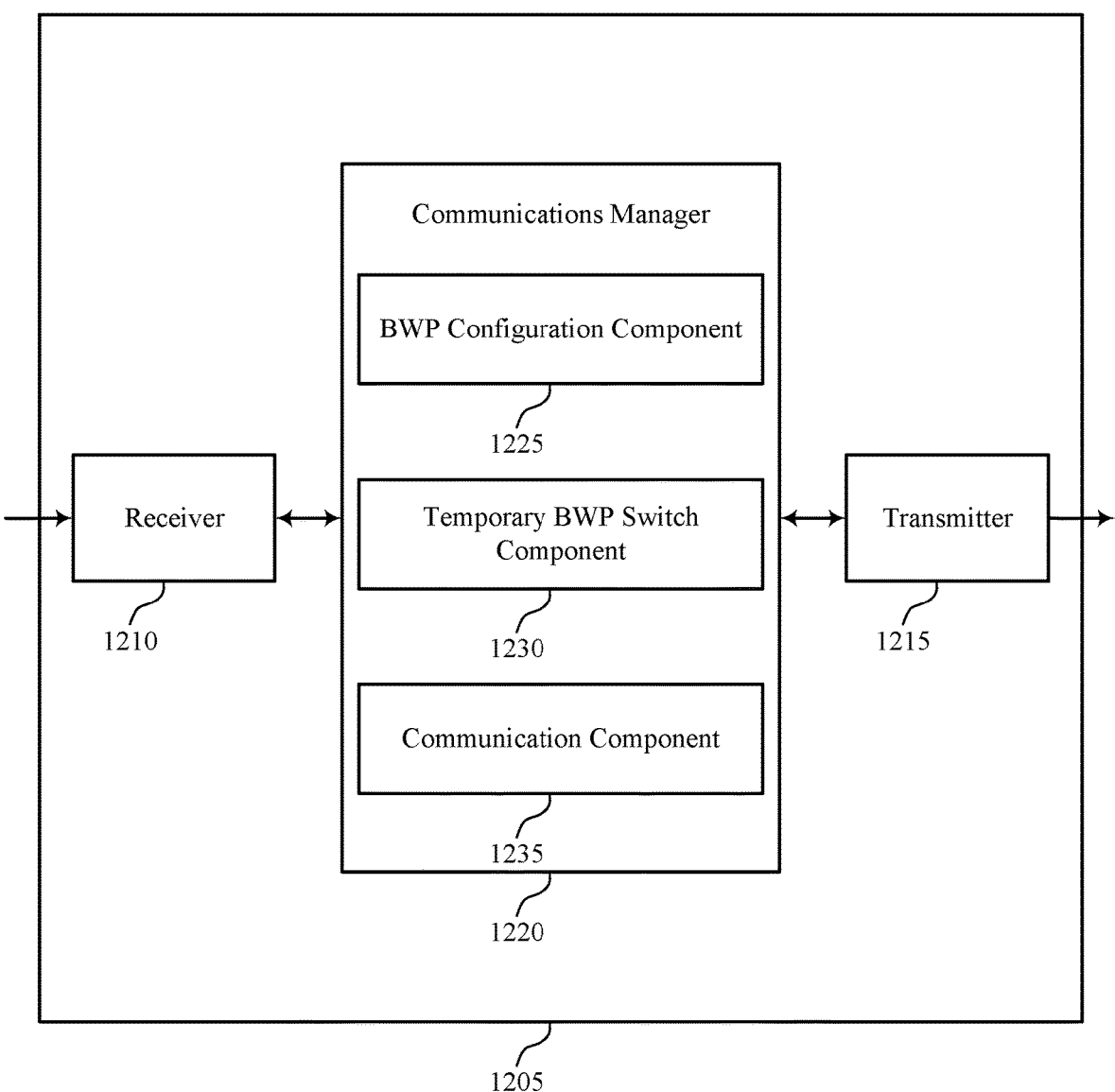

FIG. 12 shows a block diagram 1200 of a device 1205 that supports BWP switching techniques for network power savings in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of BWP switching techniques for network power savings as described herein. For example, the communications manager 1220 may include a BWP configuration component 1225, a temporary BWP switch component 1230, a communication component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity (such as the device 1205) in accordance with examples as disclosed herein. The BWP configuration component 1225 may be configured as or otherwise support a means for outputting, via a first BWP, an indication of one or more parameters associated with a temporary BWP switch procedure, the one or more parameters to be used for communications scheduled in a second BWP that is different from the first BWP. The temporary BWP switch component 1230 may be configured as or otherwise support a means for communicating via the second BWP based on a switch from the first BWP to the second BWP in accordance with the one or more parameters associated with the temporary BWP switch procedure. The communication component 1235 may be configured as or otherwise support a means for communicating via a third BWP based on a switch from the second BWP to the third BWP in accordance with the one or more parameters associated with the temporary BWP switch procedure.

Figure 13:
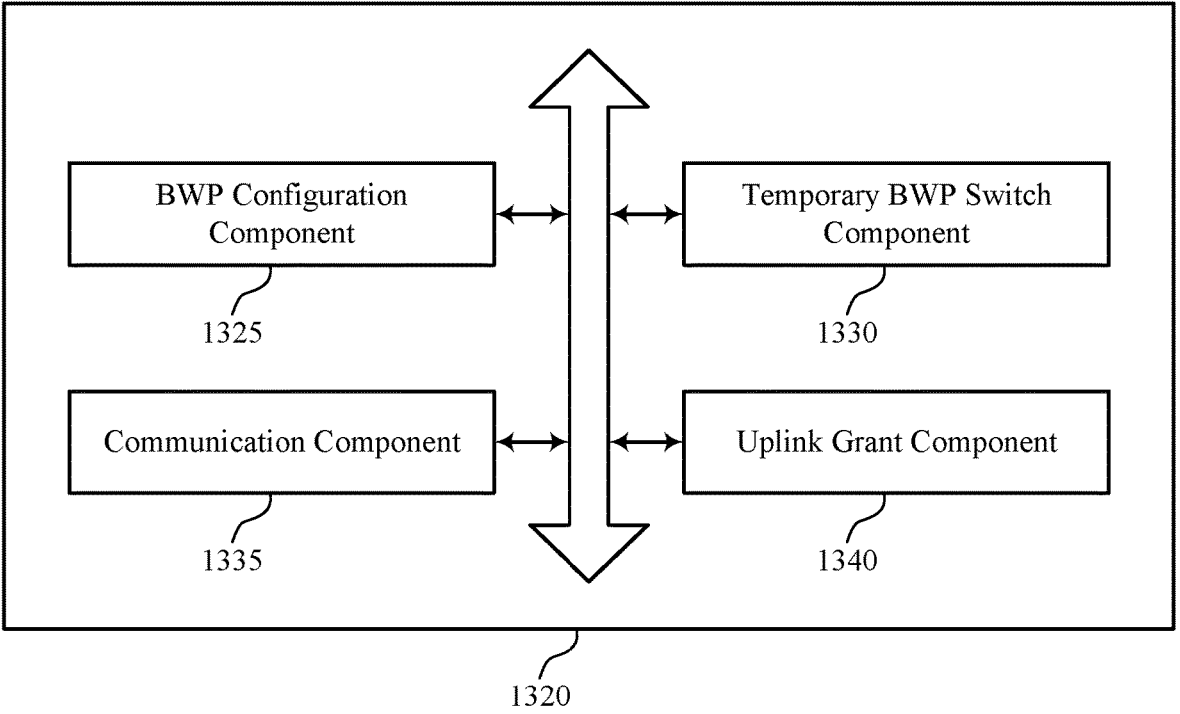
FIG. 13 shows a block diagram of a communications manager that supports BWP switching techniques for network power savings in accordance with one or more aspects of the present disclosure.

FIG. 13 shows a block diagram 1300 of a communications manager 1320 that supports BWP switching techniques for network power savings in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of BWP switching techniques for network power savings as described herein. For example, the communications manager 1320 may include a BWP configuration component 1325, a temporary BWP switch component 1330, a communication component 1335, an uplink grant component 1340, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a network entity (such as the network entity 105-*a* described with reference to FIG. 3) in accordance with examples as disclosed herein. The BWP configuration component 1325 may be configured as or otherwise support a means for outputting, via a first BWP, an indication of one or more parameters associated with a temporary BWP switch procedure, the one or more parameters to be used for communications scheduled in a second BWP that is different from the first BWP. The temporary BWP switch component 1330 may be configured as or otherwise support a means for communicating via the second BWP based on a switch from the first BWP to the second BWP in accordance with the one or more parameters associated with the temporary BWP switch procedure. The communication component 1335 may be configured as or otherwise support a means for communicating via a third BWP based on a switch from the second BWP to the third BWP in accordance with the one or more parameters associated with the temporary BWP switch procedure.

In some examples, the one or more parameters indicate a quantity of symbols, slots, frames, or milliseconds for the apparatus to monitor the second BWP in accordance with the temporary BWP switch procedure.

In some examples, the one or more parameters indicate at least one of an antenna configuration, a transmit power configuration, a transmit beam configuration, or a receive beam configuration for the communications scheduled in the second BWP.

In some examples, to support outputting the indication of the one or more parameters, the BWP configuration component 1325 may be configured as or otherwise support a means for outputting, via the first BWP, a control message that indicates the second BWP is a temporary BWP.

In some examples, the uplink grant component 1340 may be configured as or otherwise support a means for obtaining an uplink message via the second BWP in accordance with an uplink grant provided by the network entity. In some examples, the network entity further includes one or more interfaces coupled with one or more antennas.

Figure 14:
FIG. 14 shows a diagram of a system including a device that supports BWP switching techniques for network power savings in accordance with one or more aspects of the present disclosure.

FIG. 14 shows a diagram of a system 1400 including a device 1405 that supports BWP switching techniques for network power savings in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals.

In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof.

In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may be indirectly executable by the processor 1435, and may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor

1435. The processor 1435 may be configured to execute computer-readable instructions stored in a memory (e.g., the memory 1425) to cause the device 1405 to perform various functions (e.g., functions or tasks supporting BWP switching techniques for network power savings). For example, the device 1405 or a component of the device 1405 may include a processor 1435 and memory 1425 coupled with the processor 1435, the processor 1435 and memory 1425 configured to perform various functions described herein.

The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system.

A processing system may refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both.

The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a network entity (such as the device 1405) in accordance with examples as disclosed herein. For example, the communications manager 1420 may be configured as or otherwise support a means for outputting, via a first BWP, an indication of one or more parameters associated with a temporary BWP switch procedure, the one or more parameters to be used for communications scheduled in a second BWP that is different from the first BWP. The communications manager 1420 may be configured as or otherwise support a means for communicating via the second BWP based on a switch from the first BWP to the second BWP in accordance with the one or more parameters associated with the temporary BWP switch procedure. The communications manager 1420 may be configured as or otherwise support a means for communicating via a third BWP based on a switch from the second BWP to the third BWP in accordance with the one or more parameters associated with the temporary BWP switch procedure.

By including or configuring the communications manager 1420 in accordance with examples as described herein, the device 1405 may support techniques for reduced processing latency and lower signaling overhead by enabling the device 1405 to configure multiple BWP switches with a single instance of DCI, as opposed to the device 1405 transmitting an instance of DCI for each BWP switch. As a result, the device 1405 may transmit fewer control messages to the UE, which may result in greater power savings and reduced signaling overhead at the device 1405.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of BWP switching techniques for network power savings as described herein, or the processor 1435 and the memory 1425 may be otherwise configured to perform or support such operations.

FIG. 15 shows a flowchart illustrating a method 1500 that supports BWP switching techniques for network power savings in accordance with one or more aspects of the present disclosure. The operations of the method 1500 may be implemented by a UE or components thereof. For example, the operations of the method 1500 may be performed by a UE 115, as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the UE may receive, via a first BWP, an indication of one or more parameters associated with a temporary BWP switch procedure, the one or more parameters to be used for communications scheduled in a second BWP that is different from the first BWP. The operations of 1505 may be performed in accordance with examples as disclosed herein. In some examples, aspects of the operations of 1505 may be performed by a parameter reception component 925, as described with reference to FIG. 9.

At 1510, the UE may communicate with a network entity via the second BWP based on a switch from the first BWP to the second BWP in accordance with the one or more parameters associated with the temporary BWP switch procedure. The operations of 1510 may be performed in accordance with examples as disclosed herein. In some examples, aspects of the operations of 1510 may be performed by a second BWP component 930, as described with reference to FIG. 9.

At 1515, the UE may optionally transmit an uplink message to the network entity via the second BWP in accordance with an uplink grant provided by the network entity. The operations of 1515 may be performed in accordance with examples as disclosed herein. In some examples, aspects of the operations of 1515 may be performed by an uplink message component 940, as described with reference to FIG. 9.

At 1520, the UE may communicate with the network entity via a third BWP based on a switch from the second BWP to the third BWP in accordance with the one or more parameters associated with the temporary BWP switch procedure. The operations of 1520 may be performed in accordance with examples as disclosed herein. In some examples, aspects of the operations of 1520 may be performed by a third BWP component 935, as described with reference to FIG. 9.

FIG. 16 shows a flowchart illustrating a method 1600 that supports BWP switching techniques for network power savings in accordance with one or more aspects of the present disclosure. The operations of the method 1600 may be implemented by a network entity or components thereof. For example, the operations of the method 1600 may be performed by a network entity 105, as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1605, the network entity may output, via a first BWP, an indication of one or more parameters associated with a temporary BWP switch procedure, the one or more parameters to be used for communications scheduled in a second BWP that is different from the first BWP. The operations of 1605 may be performed in accordance with examples as disclosed herein. In some examples, aspects of the operations of 1605 may be performed by a BWP configuration component 1325, as described with reference to FIG. 13.

In some examples, at 1610, the network entity may output, via the first BWP, a control message that indicates the second BWP is a temporary BWP. The operations of 1610 may be performed in accordance with examples as disclosed herein. In some examples, aspects of the operations of 1610 may be performed by a BWP configuration component 1325, as described with reference to FIG. 13.

At 1615, the network entity may communicate via the second BWP based on a switch from the first BWP to the second BWP in accordance with the one or more parameters associated with the temporary BWP switch procedure. The operations of 1615 may be performed in accordance with examples as disclosed herein. In some examples, aspects of the operations of 1615 may be performed by a temporary BWP switch component 1330, as described with reference to FIG. 13.

At 1620, the network entity may communicate via a third BWP based on a switch from the second BWP to the third BWP in accordance with the one or more parameters associated with the temporary BWP switch procedure. The operations of 1620 may be performed in accordance with examples as disclosed herein. In some examples, aspects of the operations of 1620 may be performed by a communication component 1335, as described with reference to FIG. 13.

The following provides an overview of aspects of the present disclosure:

Aspect 1: An apparatus for wireless communication, comprising: a processor; and memory coupled with the processor, the processor configured to: receive, via a first bandwidth part, an indication of one or more parameters associated with a temporary bandwidth part switch procedure, the one or more parameters to be used for communications scheduled in a second bandwidth part that is different from the first bandwidth part; communicate with a network entity via the second bandwidth part based at least in part on a switch from the first bandwidth part to the second bandwidth part in accordance with the one or more parameters associated with the temporary bandwidth part switch procedure; and communicate with the network entity via a third bandwidth part based at least in part on a switch from the second bandwidth part to the third bandwidth part in accordance with the one or more parameters associated with the temporary bandwidth part switch procedure.

Aspect 2: The apparatus of aspect 1, wherein the one or more parameters indicate a quantity of symbols, slots, frames, or milliseconds for the apparatus to monitor the second bandwidth part in accordance with the temporary bandwidth part switch procedure.

Aspect 3: The apparatus of any of aspects 1 through 2, wherein the one or more parameters indicate at least one of an antenna configuration, a transmit power configuration, a transmit beam configuration, or a receive beam configuration for the communications scheduled in the second bandwidth part.

Aspect 4: The apparatus of any of aspects 1 through 3, wherein, to receive the indication of the one or more parameters, the processor is configured to: receive, via the first bandwidth part, a control message that indicates the second bandwidth part is a temporary bandwidth part.

Aspect 5: The apparatus of any of aspects 1 through 4, wherein the processor is further configured to: transmit an uplink message to the network entity via the second bandwidth part in accordance with an uplink grant provided by the network entity.

Aspect 6: The apparatus of any of aspects 1 through 5, wherein the processor is further configured to: receive a downlink message from the network entity via the second bandwidth part in accordance with the one or more parameters associated with the temporary bandwidth part switch procedure.

Aspect 7: The apparatus of aspect 6, wherein the downlink message comprises a demodulation reference signal sequence that indicates the second bandwidth part is a temporary bandwidth part.

Aspect 8: The apparatus of any of aspects 1 through 7, wherein, to receive the indication of the one or more parameters, the processor is configured to: receive a radio resource control message that indicates a configuration for each of the first bandwidth part, the second bandwidth part, and the third bandwidth part.

Aspect 9: The apparatus of any of aspects 1 through 8, wherein, to receive the indication of the one or more parameters, the processor is configured to: receive an instance of downlink control information that indicates whether a bandwidth part switch from the first bandwidth part to the second bandwidth part is a temporary bandwidth part switch.

Aspect 10: The apparatus of any of aspects 1 through 9, wherein, to receive the indication of the one or more parameters, the processor is configured to: receive an instance of downlink control information that indicates a time duration for a temporary bandwidth part switch from the first bandwidth part to the second bandwidth part.

Aspect 11: The apparatus of aspect 10, wherein the processor is further configured to: receive, via the second bandwidth part, at least one downlink message within the time duration indicated by the instance of downlink control information.

Aspect 12: The apparatus of any of aspects 10 through 11, wherein the processor is further configured to: transmit, via the second bandwidth part, at least one uplink message within the time duration indicated by the instance of downlink control information.

Aspect 13: The apparatus of any of aspects 10 through 12, wherein the one or more parameters indicate the time duration for the temporary bandwidth part switch per bandwidth part or per cell.

Aspect 14: The apparatus of any of aspects 1 through 13, wherein the processor is further configured to: switch from the second bandwidth part to the third bandwidth part within a time gap indicated by the one or more parameters associated with the temporary bandwidth part switch procedure.

Aspect 15: The apparatus of any of aspects 1 through 14, wherein the processor is further configured to: receive information associated with a downlink transmission scheduled in the second bandwidth part, wherein the information indicates that the second bandwidth part is a temporary bandwidth part.

Aspect 16: The apparatus of aspect 15, wherein the information indicates one or more of a modulation and coding scheme, a quantity of layers, a time domain resource allocation index, or a frequency domain resource allocation index associated with the downlink transmission scheduled in the second bandwidth part.

Aspect 17: The apparatus of any of aspects 15 through 16, wherein the information indicates a time duration for the apparatus to monitor the temporary bandwidth part.

Aspect 18: The apparatus of any of aspects 1 through 17, wherein the processor is further configured to: transmit a message that indicates one or more of a capability of the apparatus to perform a temporary bandwidth part switch, a quantity of bandwidth parts supported for the temporary bandwidth part switch, or a minimum time duration supported for the temporary bandwidth part switch.

Aspect 19: The apparatus of any of aspects 1 through 18 wherein the processor is further configured to: transmit an indication of a channel state information report based at least in part on one or more channel state information reference signals received via the second bandwidth part, wherein the channel state information report is generated in accordance with the one or more parameters associated with the temporary bandwidth part switch procedure.

Aspect 20: The apparatus of any of aspects 1 through 19, wherein the processor is further configured to: receive a downlink message via the second bandwidth part in accordance with the temporary bandwidth part switch procedure; and decode the downlink message based at least in part on the one or more parameters associated with the temporary bandwidth part switch procedure.

Aspect 21: The apparatus of any of aspects 1 through 20, wherein the third bandwidth part comprises the first bandwidth part.

Aspect 22: The apparatus of any of aspects 1 through 21, wherein the apparatus further comprises one or more interfaces coupled with one or more antennas.

Aspect 23: An apparatus for wireless communication, comprising: a processor; and memory coupled with the processor, the processor configured to: output, via a first bandwidth part, an indication of one or more parameters associated with a temporary bandwidth part switch procedure, the one or more parameters to be used for communications scheduled in a second bandwidth part that is different from the first bandwidth part; communicate via the second bandwidth part based at least in part on a switch from the first bandwidth part to the second bandwidth part in accordance with the one or more parameters associated with the temporary bandwidth part switch procedure; and communicate via a third bandwidth part based at least in part on a switch from the second bandwidth part to the third bandwidth part in accordance with the one or more parameters associated with the temporary bandwidth part switch procedure.

Aspect 24: The apparatus of aspect 23, wherein the one or more parameters indicate a quantity of symbols, slots, frames, or milliseconds for the apparatus to monitor the second bandwidth part in accordance with the temporary bandwidth part switch procedure.

Aspect 25: The apparatus of any of aspects 23 through 24, wherein the one or more parameters indicate at least one of an antenna configuration, a transmit power configuration, a transmit beam configuration, or a receive beam configuration for the communications scheduled in the second bandwidth part.

Aspect 26: The apparatus of any of aspects 23 through 25, wherein, to output the indication of the one or more parameters, the processor is configured to: output, via the first bandwidth part, a control message that indicates the second bandwidth part is a temporary bandwidth part.

Aspect 27: The apparatus of any of aspects 23 through 26, wherein the processor is further configured to: obtain an uplink message via the second bandwidth part in accordance with an uplink grant provided by the apparatus.

Aspect 28: The apparatus of any of aspects 23 through 27, wherein the apparatus further comprises one or more interfaces coupled with one or more antennas.

Aspect 29: An apparatus for wireless communication, comprising: a processor; and memory coupled with the processor, the processor configured to: receive, via a first bandwidth part, an indication of one or more parameters associated with a temporary bandwidth part switch procedure, the one or more parameters to be used for sidelink communications in a second bandwidth part that is different from the first bandwidth part; communicate with a sidelink UE via the second bandwidth part based at least in part on a switch from the first bandwidth part to the second bandwidth part in accordance with the one or more parameters associated with the temporary bandwidth part switch procedure; and communicate with the sidelink UE via a third bandwidth part based at least in part on a switch from the second bandwidth part to the third bandwidth part in accordance with the one or more parameters associated with the temporary bandwidth part switch procedure.

Aspect 30: The apparatus of aspect 29, wherein, to receive the indication of the one or more parameters, the processor is configured to: receive an instance of sidelink control information that indicates one or more of a time duration, an antenna configuration, a transmit power configuration, a transmit beam configuration, or a receive beam configuration for the temporary bandwidth part switch procedure.

Aspect 31: The apparatus of any of aspects 29 through 30, wherein, to communicate with the sidelink UE via the second bandwidth part, the processor is configured to: transmit one or more sidelink communications to the sidelink UE via the second bandwidth part in accordance with the one or more parameters associated with the temporary bandwidth part switch procedure.

Aspect 32: The apparatus of any of aspects 29 through 31, wherein, to communicate with the sidelink UE via the third bandwidth part, the processor is configured to: receive one or more sidelink communications from the sidelink UE via the third bandwidth part in accordance with the one or more parameters associated with the temporary bandwidth part switch procedure.

Aspect 33: The apparatus of any of aspects 29 through 32, wherein, to communicate with the sidelink UE via the second bandwidth part, the processor is configured to: relay one or more communications between the sidelink UE and a network entity in accordance with the one or more parameters associated with the temporary bandwidth part switch procedure.

Aspect 34: The apparatus of any of aspects 29 through 33, wherein the processor is further configured to: receive radio resource control signaling that indicates a plurality of bandwidth parts configured for sidelink communications, the plurality of bandwidth parts comprising one or both of the second bandwidth part or the third bandwidth part.

Aspect 35: An apparatus for wireless communication, comprising: a processor; and memory coupled with the processor, the processor configured to: transmit, via a first bandwidth part, an indication of one or more parameters associated with a temporary bandwidth part switch procedure, the one or more parameters to be used for sidelink communications in a second bandwidth part that is different from the first bandwidth part; communicate with a sidelink UE via the second bandwidth part based at least in part on a switch from the first bandwidth part to the second bandwidth part in accordance with the one or more parameters associated with the temporary bandwidth part switch procedure; and communicate with the sidelink UE via a third bandwidth part based at least in part on a switch from the second bandwidth part to the third bandwidth part in accordance with the one or more parameters associated with the temporary bandwidth part switch procedure.

Aspect 36: The apparatus of aspect 35, wherein, to transmit the indication of the one or more parameters, the processor is configured to: transmit an instance of sidelink control information that indicates one or more of a time duration, an antenna configuration, a transmit power configuration, a transmit beam configuration, or a receive beam configuration for the temporary bandwidth part switch procedure.

Aspect 37: The apparatus of any of aspects 35 through 36, wherein, to communicate with the sidelink UE via the second bandwidth part, the processor is configured to: receive one or more sidelink communications from the sidelink UE via the second bandwidth part in accordance with the one or more parameters associated with the temporary bandwidth part switch procedure.

Aspect 38: The apparatus of any of aspects 35 through 37, wherein, to communicate with the sidelink UE via the third bandwidth part, the processor is configured to: transmit one or more sidelink communications to the sidelink UE via the third bandwidth part in accordance with the one or more parameters associated with the temporary bandwidth part switch procedure.

Aspect 39: The apparatus of any of aspects 35 through 38, wherein, to communicate with the sidelink UE via the second bandwidth part, the processor is configured to: relay one or more communications between the sidelink UE and a network entity in accordance with the one or more parameters associated with the temporary bandwidth part switch procedure.

Aspect 40: The apparatus of any of aspects 35 through 39, wherein the processor is further configured to: receive radio resource control signaling that indicates a plurality of bandwidth parts configured for sidelink communications, the plurality of bandwidth parts comprising one or both of the second bandwidth part or the third bandwidth part.

Aspect 41: A method for wireless communication at a UE, comprising: receiving, via a first bandwidth part, an indication of one or more parameters associated with a temporary bandwidth part switch procedure, the one or more parameters to be used for communications scheduled in a second bandwidth part that is different from the first bandwidth part; communicating with a network entity via the second bandwidth part based at least in part on a switch from the first bandwidth part to the second bandwidth part in accordance with the one or more parameters associated with the temporary bandwidth part switch procedure; and communicating with the network entity via a third bandwidth part based at least in part on a switch from the second bandwidth part to the third bandwidth part in accordance with the one or more parameters associated with the temporary bandwidth part switch procedure.

Aspect 42: The method of aspect 41, the one or more parameters indicating a quantity of symbols, slots, frames, or milliseconds for the UE to monitor the second bandwidth part in accordance with the temporary bandwidth part switch procedure.

Aspect 43: The method of any of aspects 41 through 42, the one or more parameters indicating at least one of an antenna configuration, a transmit power configuration, a transmit beam configuration, or a receive beam configuration for the communications scheduled in the second bandwidth part.

Aspect 44: The method of any of aspects 41 through 43, the receiving comprising: receiving, via the first bandwidth part, a control message that indicates the second bandwidth part is a temporary bandwidth part.

Aspect 45: The method of any of aspects 41 through 44, further comprising: transmitting an uplink message to the network entity via the second bandwidth part in accordance with an uplink grant provided by the network entity.

Aspect 46: The method of any of aspects 41 through 45, further comprising: receiving a downlink message from the network entity via the second bandwidth part in accordance with the one or more parameters associated with the temporary bandwidth part switch procedure.

Aspect 47: The method of aspect 46, the downlink message comprising a demodulation reference signal sequence that indicates the second bandwidth part is a temporary bandwidth part.

Aspect 48: The method of any of aspects 41 through 47, the receiving comprising: receiving a radio resource control message that indicates a configuration for each of the first bandwidth part, the second bandwidth part, and the third bandwidth part.

Aspect 49: The method of any of aspects 41 through 48, the receiving comprising: receiving an instance of downlink control information that indicates whether a bandwidth part switch from the first bandwidth part to the second bandwidth part is a temporary bandwidth part switch.

Aspect 50: The method of any of aspects 41 through 49, the receiving comprising: receiving an instance of downlink control information that indicates a time duration for a temporary bandwidth part switch from the first bandwidth part to the second bandwidth part.

Aspect 51: The method of aspect 50, further comprising: receiving, via the second bandwidth part, at least one downlink message within the time duration indicated by the instance of downlink control information.

Aspect 52: The method of any of aspects 50 through 51, further comprising: transmitting, via the second bandwidth part, at least one uplink message within the time duration indicated by the instance of downlink control information.

Aspect 53: The method of any of aspects 50 through 52, the one or more parameters indicating the time duration for the temporary bandwidth part switch per bandwidth part or per cell.

Aspect 54: The method of any of aspects 41 through 53, further comprising: switching from the second bandwidth part to the third bandwidth part within a time gap indicated by the one or more parameters associated with the temporary bandwidth part switch procedure.

Aspect 55: The method of any of aspects 41 through 54, further comprising: receiving information associated with a downlink transmission scheduled in the second bandwidth part, the information indicating that the second bandwidth part is a temporary bandwidth part.

Aspect 56: The method of aspect 55, the information indicating one or more of a modulation and coding scheme, a quantity of layers, a time domain resource allocation index, or a frequency domain resource allocation index associated with the downlink transmission scheduled in the second bandwidth part.

Aspect 57: The method of any of aspects 55 through 56, the information indicating a time duration for the UE to monitor the temporary bandwidth part.

Aspect 58: The method of any of aspects 41 through 57, further comprising: transmitting a message that indicates one or more of a capability of the UE to perform a temporary bandwidth part switch, a quantity of bandwidth parts supported for the temporary bandwidth part switch, or a minimum time duration supported for the temporary bandwidth part switch.

Aspect 59: The method of any of aspects 41 through 58, further comprising: transmitting an indication of a channel state information report based at least in part on one or more channel state information reference signals received via the second bandwidth part, wherein the channel state information report is generated in accordance with the one or more parameters associated with the temporary bandwidth part switch procedure.

Aspect 60: The method of any of aspects 41 through 59, further comprising: receiving a downlink message via the second bandwidth part in accordance with the temporary bandwidth part switch procedure; and decoding the downlink message based at least in part on the one or more parameters associated with the temporary bandwidth part switch procedure.

Aspect 61: The method of any of aspects 41 through 60, the third bandwidth part comprising the first bandwidth part.

Aspect 62: The method of any of aspects 41 through 61, the UE comprising one or more interfaces coupled with one or more antennas.

Aspect 63: A method for wireless communication at a network entity, comprising: outputting, via a first bandwidth part, an indication of one or more parameters associated with a temporary bandwidth part switch procedure, the one or more parameters to be used for communications scheduled in a second bandwidth part that is different from the first bandwidth part; communicating via the second bandwidth part based at least in part on a switch from the first bandwidth part to the second bandwidth part in accordance with the one or more parameters associated with the temporary bandwidth part switch procedure; and communicating via a third bandwidth part based at least in part on a switch from the second bandwidth part to the third bandwidth part in accordance with the one or more parameters associated with the temporary bandwidth part switch procedure.

Aspect 64: The method of aspect 63, the one or more parameters indicating a quantity of symbols, slots, frames, or milliseconds for the apparatus to monitor the second bandwidth part in accordance with the temporary bandwidth part switch procedure.

Aspect 65: The method of any of aspects 63 through 64, the one or more parameters indicating at least one of an antenna configuration, a transmit power configuration, a transmit beam configuration, or a receive beam configuration for the communications scheduled in the second bandwidth part.

Aspect 66: The method of any of aspects 63 through 65, the outputting comprising: outputting, via the first bandwidth part, a control message that indicates the second bandwidth part is a temporary bandwidth part.

Aspect 67: The method of any of aspects 63 through 66, further comprising: obtaining an uplink message via the second bandwidth part in accordance with an uplink grant provided by the network entity.

Aspect 68: The method of any of aspects 63 through 67, the network entity comprising one or more interfaces coupled with one or more antennas.

Aspect 69: A method for wireless communication at a first sidelink UE, comprising: receiving, via a first bandwidth part, an indication of one or more parameters associated with a temporary bandwidth part switch procedure, the one or more parameters to be used for sidelink communications in a second bandwidth part that is different from the first bandwidth part; communicating with a second sidelink UE via the second bandwidth part based at least in part on a switch from the first bandwidth part to the second bandwidth part in accordance with the one or more parameters associated with the temporary bandwidth part switch procedure; and communicating with the second sidelink UE via a third bandwidth part based at least in part on a switch from the second bandwidth part to the third bandwidth part in accordance with the one or more parameters associated with the temporary bandwidth part switch procedure.

Aspect 70: The method of aspect 69, the receiving comprising: receiving an instance of sidelink control information that indicates one or more of a time duration, an antenna configuration, a transmit power configuration, a transmit beam configuration, or a receive beam configuration for the temporary bandwidth part switch procedure.

Aspect 71: The method of any of aspects 69 through 70, the communicating comprising: transmitting one or more sidelink communications to the second sidelink UE via the second bandwidth part in accordance with the one or more parameters associated with the temporary bandwidth part switch procedure.

Aspect 72: The method of any of aspects 69 through 71, the communicating comprising: receiving one or more sidelink communications from the second sidelink UE via the third bandwidth part in accordance with the one or more parameters associated with the temporary bandwidth part switch procedure.

Aspect 73: The method of any of aspects 69 through 72, the communicating comprising: relaying one or more communications between the second sidelink UE and a network entity in accordance with the one or more parameters associated with the temporary bandwidth part switch procedure.

Aspect 74: The method of any of aspects 69 through 73, further comprising: receiving radio resource control signaling that indicates a plurality of bandwidth parts configured for sidelink communications, the plurality of bandwidth parts comprising one or both of the second bandwidth part or the third bandwidth part.

Aspect 75: A method for wireless communication at a second sidelink UE, comprising: transmitting, via a first bandwidth part, an indication of one or more parameters associated with a temporary bandwidth part switch procedure, the one or more parameters to be used for sidelink communications in a second bandwidth part that is different from the first bandwidth part; communicating with a first sidelink UE via the second bandwidth part based at least in part on a switch from the first bandwidth part to the second bandwidth part in accordance with the one or more parameters associated with the temporary bandwidth part switch procedure; and communicating with the first sidelink UE via a third bandwidth part based at least in part on a switch from the second bandwidth part to the third bandwidth part in accordance with the one or more parameters associated with the temporary bandwidth part switch procedure.

Aspect 76: The method of aspect 75, the transmitting comprising: transmitting an instance of sidelink control information that indicates one or more of a time duration, an antenna configuration, a transmit power configuration, a transmit beam configuration, or a receive beam configuration for the temporary bandwidth part switch procedure.

Aspect 77: The method of any of aspects 75 through 76, the communicating comprising: receiving one or more sidelink communications from the first sidelink UE via the second bandwidth part in accordance with the one or more parameters associated with the temporary bandwidth part switch procedure.

Aspect 78: The method of any of aspects 75 through 77, the communicating comprising: transmitting one or more sidelink communications to the first sidelink UE via the third bandwidth part in accordance with the one or more parameters associated with the temporary bandwidth part switch procedure.

Aspect 79: The method of any of aspects 75 through 78, the communicating comprising: relaying one or more communications between the first sidelink UE and a network entity in accordance with the one or more parameters associated with the temporary bandwidth part switch procedure.

Aspect 80: The method of any of aspects 75 through 79, further comprising: receiving radio resource control signaling that indicates a plurality of bandwidth parts configured for sidelink communications, the plurality of bandwidth parts comprising one or both of the second bandwidth part or the third bandwidth part.

Aspect 81: An apparatus for wireless communication, comprising at least one means for performing a method of any of aspects 41 through 62.

Aspect 82: A non-transitory computer-readable medium storing code for wireless communication, the code comprising instructions executable by a processor to perform a method of any of aspects 41 through 62.

Aspect 83: An apparatus for wireless communication, comprising at least one means for performing a method of any of aspects 63 through 68.

Aspect 84: A non-transitory computer-readable medium storing code for wireless communication, the code comprising instructions executable by a processor to perform a method of any of aspects 63 through 68.

Aspect 85: An apparatus for wireless communication, comprising at least one means for performing a method of any of aspects 69 through 74.

Aspect 86: A non-transitory computer-readable medium storing code for wireless communication, the code comprising instructions executable by a processor to perform a method of any of aspects 69 through 74.

Aspect 87: An apparatus for wireless communication, comprising at least one means for performing a method of any of aspects 75 through 80.

Aspect 88: A non-transitory computer-readable medium storing code for wireless communication, the code comprising instructions executable by a processor to perform a method of any of aspects 75 through 80.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, including in the claims, the terms "a" and "an" shall be construed in the same manner as "one or more" or "at least one," which include the possibility of more than one.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE) in a wireless network, comprising:
   one or more memories; and
   one or more processors coupled with the one or more memories and configured to cause the UE to:
      receive, via a first bandwidth part, an indication of one or more parameters associated with a temporary bandwidth part switch procedure, the one or more parameters to be used for communications scheduled in a second bandwidth part that is different from the first bandwidth part, wherein the indication of the one or more parameters comprises an instance of downlink control information that indicates a time duration for a temporary bandwidth part switch from the first bandwidth part to the second bandwidth part;
      communicate with a network entity via the second bandwidth part based at least in part on a switch from the first bandwidth part to the second bandwidth part in accordance with the one or more parameters associated with the temporary bandwidth part switch procedure; and
      communicate with the network entity via a third bandwidth part based at least in part on a switch from the second bandwidth part to the third bandwidth part in accordance with the one or more parameters associated with the temporary bandwidth part switch procedure.

2. The apparatus of claim 1, wherein the one or more parameters indicate a quantity of symbols, slots, frames, or milliseconds for the apparatus to monitor the second bandwidth part in accordance with the temporary bandwidth part switch procedure.

3. The apparatus of claim 1, wherein the one or more parameters indicate at least one of an antenna configuration, a transmit power configuration, a transmit beam configuration, or a receive beam configuration for the communications scheduled in the second bandwidth part.

4. The apparatus of claim 1, wherein, to receive the indication of the one or more parameters, the one or more processors are configured to cause the UE to:
   receive, via the first bandwidth part, a control message that indicates the second bandwidth part is a temporary bandwidth part.

5. The apparatus of claim 1, wherein the one or more processors are further configured to cause the UE to:
   transmit an uplink message to the network entity via the second bandwidth part in accordance with an uplink grant provided by the network entity.

6. The apparatus of claim 1, wherein the one or more processors are further configured to cause the UE to:
   receive a downlink message from the network entity via the second bandwidth part in accordance with the one or more parameters associated with the temporary bandwidth part switch procedure.

7. The apparatus of claim 6, wherein the downlink message comprises a demodulation reference signal sequence that indicates the second bandwidth part is a temporary bandwidth part.

8. The apparatus of claim 1, wherein, to receive the indication of the one or more parameters, the one or more processors are configured to cause the UE to:
   receive a radio resource control message that indicates a configuration for one or more of the first bandwidth part, the second bandwidth part, and the third bandwidth part.

9. The apparatus of claim 1, wherein, to receive the indication of the one or more parameters, the one or more processors are configured to cause the UE to:
   receive an instance of downlink control information that indicates whether a bandwidth part switch from the first bandwidth part to the second bandwidth part is the temporary bandwidth part switch.

10. The apparatus of claim 1, wherein the one or more processors are further configured to cause the UE to:
   receive, via the second bandwidth part, at least one downlink message within the time duration indicated by the instance of downlink control information.

11. The apparatus of claim 1, wherein the one or more processors are further configured to cause the UE to:
   transmit, via the second bandwidth part, at least one uplink transmission within the time duration indicated by the instance of downlink control information.

12. The apparatus of claim 1, wherein the one or more parameters indicate the time duration for the temporary bandwidth part switch per bandwidth part or per cell.

13. The apparatus of claim 1, wherein the one or more processors are further configured to cause the UE to:

switch from the second bandwidth part to the third bandwidth part within a time gap indicated by the one or more parameters associated with the temporary bandwidth part switch procedure.

14. The apparatus of claim 1, wherein the one or more processors are further configured to cause the UE to:

receive information associated with a downlink message scheduled in the second bandwidth part, wherein the information indicates that the second bandwidth part is a temporary bandwidth part.

15. The apparatus of claim 14, wherein the information indicates one or more of a modulation and coding scheme, a quantity of layers, a time domain resource allocation index, or a frequency domain resource allocation index associated with the downlink message scheduled in the second bandwidth part.

16. The apparatus of claim 14, wherein the information indicates a time duration for the apparatus to monitor the temporary bandwidth part.

17. The apparatus of claim 1, wherein the one or more processors are further configured to cause the UE to:

transmit a message that indicates one or more of a capability of the apparatus to perform a temporary bandwidth part switch, a quantity of bandwidth parts supported for the temporary bandwidth part switch, or a minimum time duration supported for the temporary bandwidth part switch.

18. The apparatus of claim 1, wherein the one or more processors are further configured to cause the UE to:

transmit an indication of a channel state information report based at least in part on one or more channel state information reference signals received via the second bandwidth part, wherein the channel state information report is generated in accordance with the one or more parameters associated with the temporary bandwidth part switch procedure.

19. The apparatus of claim 1, wherein the one or more processors are further configured to cause the UE to:

receive a downlink message via the second bandwidth part in accordance with the temporary bandwidth part switch procedure; and decode the downlink message based at least in part on the one or more parameters associated with the temporary bandwidth part switch procedure.

20. The apparatus of claim 1, wherein the third bandwidth part comprises the first bandwidth part.

21. The apparatus of claim 1, wherein the apparatus further comprises one or more interfaces coupled with one or more antennas.

22. A method for wireless communication at a user equipment (UE), comprising:

receiving, via a first bandwidth part, an indication of one or more parameters associated with a temporary bandwidth part switch procedure, the one or more parameters to be used for communications scheduled in a second bandwidth part that is different from the first bandwidth part, wherein the indication of the one or more parameters comprises an instance of downlink control information that indicates a time duration for a temporary bandwidth part switch from the first bandwidth part to the second bandwidth part;

communicating with a network entity via the second bandwidth part based at least in part on a switch from the first bandwidth part to the second bandwidth part in accordance with the one or more parameters associated with the temporary bandwidth part switch procedure; and communicating with the network entity via a third bandwidth part based at least in part on a switch from the second bandwidth part to the third bandwidth part in accordance with the one or more parameters associated with the temporary bandwidth part switch procedure.

23. The method of claim 22, wherein the one or more parameters indicate a quantity of symbols, slots, frames, or milliseconds for the UE to monitor the second bandwidth part in accordance with the temporary bandwidth part switch procedure.

24. The method of claim 22, wherein the one or more parameters indicate at least one of an antenna configuration, a transmit power configuration, a transmit beam configuration, or a receive beam configuration for the communications scheduled in the second bandwidth part.

25. The method of claim 22, wherein, receiving the indication of the one or more parameters comprises:

receiving, via the first bandwidth part, a control message that indicates the second bandwidth part is a temporary bandwidth part.

26. The method of claim 22, further comprising:

transmitting an uplink message to the network entity via the second bandwidth part in accordance with an uplink grant provided by the network entity.

27. The method of claim 22, further comprising:

receiving a downlink message from the network entity via the second bandwidth part in accordance with the one or more parameters associated with the temporary bandwidth part switch procedure.

28. The method of claim 27, wherein the downlink message comprises a demodulation reference signal sequence that indicates the second bandwidth part is a temporary bandwidth part.

29. A user equipment (UE) for wireless communication, comprising:

means for receiving, via a first bandwidth part, an indication of one or more parameters associated with a temporary bandwidth part switch procedure, the one or more parameters to be used for communications scheduled in a second bandwidth part that is different from the first bandwidth part, wherein the indication of the one or more parameters comprises an instance of downlink control information that indicates a time duration for a temporary bandwidth part switch from the first bandwidth part to the second bandwidth part;

means for communicating with a network entity via the second bandwidth part based at least in part on a switch from the first bandwidth part to the second bandwidth part in accordance with the one or more parameters associated with the temporary bandwidth part switch procedure; and means for communicating with the network entity via a third bandwidth part based at least in part on a switch from the second bandwidth part to the third bandwidth part in accordance with the one or more parameters associated with the temporary bandwidth part switch procedure.

30. A non-transitory computer-readable medium storing code for wireless communication, the code comprising instructions executable by one or more processors to:

receive, via a first bandwidth part, an indication of one or more parameters associated with a temporary bandwidth part switch procedure, the one or more parameters to be used for communications scheduled in a second bandwidth part that is different from the first bandwidth part, wherein the indication of the one or more parameters comprises an instance of downlink control information that indicates a time duration for a temporary bandwidth part switch from the first bandwidth part to the second bandwidth part; 5 communicate with a network entity via the second bandwidth part based at least in part on a switch from the first bandwidth part to the second bandwidth part in accordance with the one or more parameters associated 10 with the temporary bandwidth part switch procedure; and communicate with the network entity via a third bandwidth part based at least in part on a switch from the second bandwidth part to the third bandwidth part in 15 accordance with the one or more parameters associated with the temporary bandwidth part switch procedure.

* * * * *